United States Patent
Hwang et al.

(10) Patent No.: US 11,416,243 B2
(45) Date of Patent: Aug. 16, 2022

(54) MICROSERVICE DECOMPOSITION STRATEGY OF MONOLITHIC APPLICATIONS

(71) Applicant: International Business Machines Corporation, Armonk, NY (US)

(72) Inventors: Jinho Hwang, Ossining, NY (US); Anup Kalia, Elmsford, NY (US); Jin Xiao, White Plains, NY (US); Malik Jackson, Baltimore, MD (US); Maja Vukovic, New York, NY (US); John Rofrano, Mahopac, NY (US); Senthil Kumar Kumarasamy Mani, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 16/750,532

(22) Filed: Jan. 23, 2020

(65) Prior Publication Data

US 2021/0232390 A1 Jul. 29, 2021

(51) Int. Cl.
*G06F 9/44* (2018.01)
*G06F 8/72* (2018.01)
(Continued)

(52) U.S. Cl.
CPC .............. *G06F 8/72* (2013.01); *G06F 9/226* (2013.01); *H04L 41/0803* (2013.01)

(58) Field of Classification Search
CPC ......... G06F 8/72; G06F 9/226; H04L 41/0803
(Continued)

(56) References Cited

U.S. PATENT DOCUMENTS

| 7,509,298 B2 | 3/2009 | Chandra et al. |
| 8,973,008 B2 | 3/2015 | Czajkowski et al. |

(Continued)

FOREIGN PATENT DOCUMENTS

| CN | 107667517 A | 2/2018 |
| WO | 2007/129224 | 11/2007 |

OTHER PUBLICATIONS

Kamimura et al., "Extracting Candidates of Microservices from Monolithic Application Code", 2018, IEEE, pp. 571-580. (Year: 2018).*

(Continued)

*Primary Examiner* — Ted T. Vo
(74) *Attorney, Agent, or Firm* — Amin, Turocy & Watson, LLP

(57) ABSTRACT

Systems and techniques that facilitate automated recommendation of microservice decomposition strategies for monolithic applications are provided. In various embodiments, a community detection component can detect a disjoint code cluster in a monolithic application based on a code property graph characterizing the monolithic application. In various aspects, the code property graph can be based on a temporal code evolution of the monolithic application. In various embodiments, a topic modeling component can identify a functional purpose of the disjoint code cluster based on a business document corpus corresponding to the monolithic application. In various embodiments, a microservices component can recommend a microservice to replace the disjoint code cluster based on the functional purpose.

25 Claims, 18 Drawing Sheets

(51) Int. Cl.
*H04L 41/0803* (2022.01)
*G06F 9/22* (2006.01)

(58) Field of Classification Search
USPC ............. 717/101–109, 120–123, 132–133, 717/143–144
See application file for complete search history.

(56) References Cited

U.S. PATENT DOCUMENTS

| | | | |
|---|---|---|---|
| 9,842,045 B2* | 12/2017 | Heorhiadi | G06F 11/3692 |
| 10,230,571 B2* | 3/2019 | Rangasamy | H04L 41/0803 |
| 10,338,913 B2 | 7/2019 | Franchitti | |
| 10,356,214 B2* | 7/2019 | Joshi | G06F 9/45558 |
| 10,412,154 B2 | 9/2019 | Vyas et al. | |
| 10,430,250 B2 | 10/2019 | Ishikawa et al. | |
| 10,620,947 B2* | 4/2020 | Gavisiddappa Kodigenahalli | G06F 8/76 |
| 10,637,952 B1* | 4/2020 | Koenig | H04L 67/2809 |
| 10,956,680 B1* | 3/2021 | Gupta | G06F 40/205 |
| 2016/0124742 A1 | 5/2016 | Rangasamy et al. | |
| 2018/0136931 A1* | 5/2018 | Hendrich | G06F 11/302 |
| 2019/0108067 A1 | 4/2019 | Ishikawa et al. | |
| 2020/0285451 A1* | 9/2020 | Agarwal | G06F 8/36 |
| 2021/0036925 A1* | 2/2021 | Boddam | H04L 41/5019 |

OTHER PUBLICATIONS

Tyszberowicz et al., "Identifying Microservices Using Functional Decomposition", 2018, Springer Nature Switzerland AG, pp. 50-65. (Year: 2018).*

Eski et al., "An Automatic Extraction Approach—Transition to Microservices Architecture from Monolithic Application", 2018, ACM, 6 pages. (Year: 2018).*

Zheng et al., "Model-Parallel Inference for Big Topic Models", 2014, Carnegie Mellon University, 12 pages. (Year: 2014).*

Mazlami et al., "Extraction of Microservices from Monolithic Software Architectures", 2017, IEEE, pp. 524-531 (Year: 2017).*

International Search Report and Written Opinion received for PCT Application Serial No. PCT/IB2021/050351 dated Apr. 26, 2021, 10 pages.

Collin et al., "Improving Code Density of Embedded Software using a 2-level Dictionary Code Compression Architecture", KTH ICT Dept. of Electronics, Computer, and Software Systems, Dec. 31, 2008, 08 pages.

Fritzsch et al., "From Monolith to Microservices: A Classification of Refactoring Approaches," arXiv:1807.10059, Jul. 26, 2018, 13 pages.

Knoche et al., "Using Microservices for Legacy Software Modernization," IEEE Software, May 2018, 7 pages.

Disclosed Anonymously, "Method for Decomposing Monolithic Applications into Candidate Microservices Proposals, Complexity Metrics, and Effort Estimates," IP.com No. IPCOM000258428D, May 10, 2019, 4 pages.

Disclosed Anonymously, "Method and System for Progressively Migrating Application Program Interface (APIs) in Software Defined Environment (SDE)," IP.com No. IPCOM000245017D, Feb. 6, 2016, 7 pages.

Taibi et al., "From Monolithic Systems to Microservices: A Decomposition Framework based on Process Mining," TASE—Tampere Software Engineering Research Group, In Proceedings of the 9th International Conference on Cloud Computing and Services Science (Heraklion, Crete, Greece, CLOSER May 2-4, 2019), pp. 153-164, DOI: 10.5220/0007755901530164.

Yamaguchi et al., "Modeling and Discovering Vulnerabilities with Code Property Graphs," IEEE Symposium on Security and Privacy, Berkeley, CA, USA, May 18-21, 2014, pp. 590-604, doi: 10.1109/SP.2014.44.

* cited by examiner

STORING, BY THE DEVICE, DEPENDENCY PATTERNS LEARNED FROM CODE PROPERTY GRAPHS OF OTHER MONOLITHIC APPLICATIONS, WHEREIN THE DEPENDENCY PATTERNS FACILITATE THE DETECTING THE DISJOINT CODE CLUSTERS AND THE IDENTIFYING THE FUNCTIONAL PURPOSE — 1402

MICROSERVICE DECOMPOSITION STRATEGY OF MONOLITHIC APPLICATIONS

BACKGROUND

The subject disclosure relates to microservice decomposition, and more specifically to automatically recommending microservice decomposition strategies for monolithic applications.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate automated recommendation of microservice decomposition strategies for monolithic applications are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a community detection component that can detect a disjoint code cluster in a monolithic application based on a code property graph characterizing the monolithic application. In various aspects, the code property graph can be based on a temporal code evolution of the monolithic application. In various embodiments, the computer-executable components can comprise a topic modeling component that can identify a functional purpose of the disjoint code cluster, based on a business document corpus corresponding to the monolithic application. In various embodiments, a microservices component can recommend a microservice to replace the disjoint code cluster based on the functional purpose.

According to one or more embodiments, the above-described system can be implemented as a computer-implemented method.

According to one or more embodiments, the above-described system can be implemented as a computer program product for facilitating automated recommendation of microservice decomposition strategies for monolithic applications. The computer program product can comprise a computer readable storage medium having program instructions embodied therewith. The program instructions can be executable by a processing component, which can cause the processing component to perform various acts.

According to one or more embodiments, an apparatus is provided. The apparatus can comprise a memory that can store computer-executable components. The apparatus can further comprise a processor that can be operably coupled to the memory and that can execute the computer-executable components stored in the memory. In various embodiments, the computer-executable components can comprise a community detection component that can identify candidates for microservice decomposition in a monolithic application, based on a code property graph corresponding to the monolithic application. In various embodiments, the computer-executable components can comprise a topic modeling component that can identify functions respectively performed by the identified candidates, based on business documents corresponding to the monolithic application.

According to one or more embodiments, the above-described apparatus can be implemented as a computer-implemented method.

DETAILED DESCRIPTION

Figure 1:
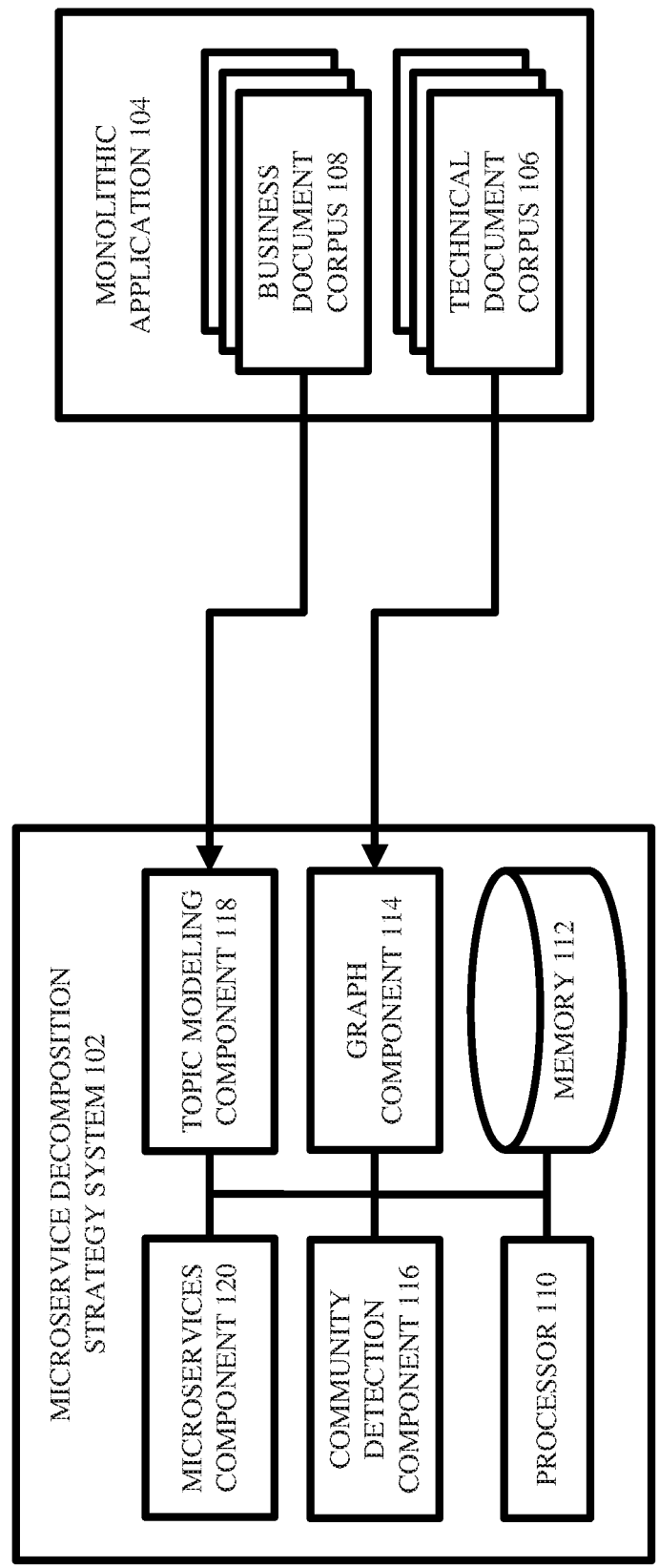
FIG. 1 illustrates a block diagram of an example, non-limiting system that facilitates automated recommendation of microservice decomposition strategies for monolithic applications in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A legacy application can be software (e.g., a computer-executable program and/or a computer-executable application) that is considered old, outdated, and/or in need of updating, yet is still in use for any number of reasons (e.g., because the legacy application provides satisfactory results, because the costs involved in replacing the legacy application and/or retraining users/operators of the legacy application are prohibitive, and so on). Legacy applications are often built as monolithic architectures. A monolithic application can be a self-contained application that is independent from other computing applications and that combines all and/or substantially all computer-executable components and/or computer-executable instructions needed to facilitate a particular function into a single computer program and/or computer platform. These monolithic applications are generally too big and/or cumbersome to fit into a cloud-native environment, and they often do not exhibit the benefits that cloud-native applications offer (e.g., scalability, continuous deployment, stateless deployment, agility, and so on). In various situations, it can be beneficial to fully and/or partially decompose a monolithic application (e.g., whether legacy or not legacy) into one or more microservices. A microservice can be an independently developable and/or deployable sub-application that performs a particular function and/or business task. For example, if a monolithic application is a computer program that performs actions A, B, and C, the monolithic application can be fully decomposed into three microservices: a first microservice that performs action A, a second microservice that performs action B, and a third microservice that performs action C. In some cases, a monolithic application can be partially decomposed such that only a portion of the monolithic application is replaced by microservices, and the remainder of the monolithic application is kept and/or still used (e.g., decomposing the above exemplary monolithic application into only one or two microservices rather than three). In various instances, a microservice can be cloud-based. In various situations, microservice decomposition of a monolithic application can result in improved performance of the monolithic application (e.g., decoupled components, increased complexity, immutable architecture, faster computation, shorter development timeframes, minimized dependencies and/or shared concerns, smaller and/or more focused applications, data contracts and/or lack thereof between related entities, and so on).

However, decomposing a monolithic application into one or more microservices can be a difficult task. Generally, such decomposition is too complex and/or time-consuming to be effectively performed manually. Thus, automated systems/techniques for facilitating microservice decomposition are beneficial.

Although some automated systems/techniques of microservice decomposition exist, they usually utilize simple heuristics to cluster and merge code classes and methods based only on a call graph of the monolithic application. Other existing systems/techniques merely utilize process mining and process log files to recommend alternative slicing solutions. Still other existing systems/techniques utilize only natural language processing of source code to identify candidates for decomposition, which can be suboptimal since natural language processing relies on good programming style and best practices which are not often exhibited in the source code of monolithic applications.

Such existing systems/techniques experience many disadvantages. For instance, such existing systems/techniques do not use statistical methods to determine the semantic structure of the monolithic application (e.g., the structure of the source code of the application), do not take into account data dependencies and/or control dependencies of the monolithic application, and do not utilize the temporal code evolution (e.g., the changes to the application's code over time) of the monolithic application to identify candidates for microservice decomposition. Moreover, such systems/techniques focus only on the source code of monolithic applications; they do not leverage business documentation associated with the monolithic application to determine and/or infer functional topics and/or functional purposes associated with identified code clusters when recommending suitable microservices to replace the identified code clusters. Various embodiments of the invention can address one or more of these issues.

Note that, although one or more embodiments of the invention can be particularly useful in modernizing a legacy monolithic application, various embodiments of the invention can be utilized to recommend and/or implement microservice decomposition strategies for non-legacy monolithic applications (e.g., monolithic applications that are not considered old, outdated, and/or in need of updating).

Embodiments described herein include systems, computer-implemented methods, apparatus, and/or computer program products that facilitate automated recommendation and/or implementation of microservice decomposition strategies for monolithic applications. In various embodiments, a monolithic application can be associated with a technical document corpus (e.g., source code, binary code, deployment scripts, statistics regarding running instances, different variants/configurations, code repositories, and so on) and a business document corpus (e.g., design documentation, user guides/manuals, training guides/manuals, troubleshooting guides/manuals, README pages, Wiki pages, GitHub pages, and so on).

In various embodiments, a graph component can generate a code property graph characterizing the monolithic application, based on the technical document corpus (e.g., the graph component can analyze the source code and/or scripts corresponding to the monolithic application in order to construct the code property graph). The code property graph can be a joint data structure resulting from the combination of an abstract syntax tree corresponding to the monolithic application, a control flow graph corresponding to the monolithic application, and a program dependence graph corresponding to the monolithic application. That is, the code property graph can be a multi-graph that provides a comprehensive view of the structure, control flow, and data dependencies of the monolithic application simultaneously. Such a joint data structure can be useful in analyzing the monolithic application.

In various embodiments, the graph component can augment and/or modify the code property graph (e.g., augment and/or modify edge weights and/or edge properties in the code property graph, augment and/or modify node weights and/or node properties in the code property graph, add and/or subtract edges and/or nodes in the code property graph, and so on) based on a temporal code evolution of the monolithic application. In various aspects, the temporal code evolution can be a timeline and/or chronology of changes to the source code of the monolithic application, as recorded and/or stored in a code repository corresponding to the monolithic application. In various instances, portions/clusters of code that are changed at the same and/or substantially similar times can be inferred to be more closely related and/or more tightly coupled to each other than portions/clusters of code that are changed at substantially different times.

For example, suppose that the source code of a monolithic application contains code grouping A, code grouping B, and code grouping C. Then, the code property graph of the monolithic application can contain nodes corresponding to code grouping A, other nodes corresponding to code grouping B, and still other nodes corresponding to code grouping C. Suppose that a code repository shows that code grouping A and code grouping C were changed/updated by a user/operator at the same and/or substantially same times in a given time period (e.g., for a given two-week period, both code grouping A and code grouping C were changed five separate times, each at substantially the same time and/or on the same day). Further, suppose that the code repository shows that code grouping B was not changed at all and/or was changed at substantially different times (e.g., on different days) than code grouping A and code grouping C. Such temporal changes to the source code of the monolithic application can indicate that code grouping A and code grouping C are more closely related to each other than they are to code grouping B. Thus, the graph component can augment/modify the code property graph to demonstrate this relatedness (e.g., by increasing edge weights between nodes that represent code grouping A and nodes that represent code grouping C, by adding more edges between nodes that represent code grouping A and nodes that represent code grouping C, by decreasing edge weights between nodes that represent code grouping B and nodes the represent code groupings A and C, by subtracting edges between nodes that represent code grouping B and nodes that represent code groupings A and C, and so on). Such augmentation can reflect the fact that code grouping A and code grouping C are sufficiently cohesive such that they should be treated together as a single code cluster, and that code grouping B is sufficiently unrelated from the other code groupings such that it should be treated alone as its own, independent code cluster.

In various embodiments, a community detection component can detect, via any suitable graph theory technique, a disjoint code cluster in the code property graph (e.g., after the code property graph is augmented based on the temporal code evolution). In various instances, the disjoint code cluster can be considered as a candidate for microservice decomposition (e.g., a portion of source code that can potentially be replaced by a microservice). In various aspects, a disjoint code cluster can be any portion of the source code of the monolithic application that exhibits a predetermined level of cohesiveness (e.g., such that the nodes representing the disjoint code cluster in the code property graph are sufficiently related and/or attached to each other so as to merit being treated together as a single cluster) and a predetermined level of coupling (e.g., such that the nodes representing the disjoint code cluster in the code property graph are sufficiently disconnected from, insulated from, and/or independent of other nodes representing other code clusters in the monolithic application so as to merit being treated separately from the other clusters). In various aspects, such predetermined thresholds/levels of cohesiveness and/or coupling can be selected as desired by a user/operator.

As mentioned above, in various instances, the temporal code evolution of the monolithic application can provide valuable information regarding the inter-relatedness of various portions of the source code of the monolithic application. By augmenting the code property graph based on such information, community detection of the code property graph can be more accurately and/or efficaciously performed (e.g., when the code property graph is based on the temporal code evolution, the code property graph can more accurately indicate which portions of source code are more closely and/or tightly related to each other, which can result in more accurate community detection and/or community clustering).

In various embodiments, a topic modeling component can identify, via any suitable topic modeling techniques, a functional purpose of the disjoint code cluster (e.g., a business task, business function, a business capability, and/or a business action carried out and/or facilitated by the disjoint code cluster) based on the business document corpus of the monolithic application. For example, the topic modeling component can analyze design documents, user guides/manuals, README files, Wiki files, GitHub files, and so on relating to the monolithic application, in order to determine what task, function, capability, and/or action the disjoint code cluster performs. For instance, the business document corpus can include natural language text that explains and/or suggests what various portions of the source code of the monolithic application do (e.g., one code cluster might authenticate a user, another code cluster might perform a recommending function, still another code cluster might facilitate collection of billing information, and so on). In various cases, the topic modeling component can analyze such information in order to determine the function performed by the detected disjoint code cluster (e.g., the functional purpose of the disjoint code cluster).

In various embodiments, a microservices component can recommend a microservice to replace the disjoint code cluster, based on the functional purpose (e.g., the disjoint code cluster can be replaced by a microservice that facilitates/performs the same and/or similar task, function, capability, and/or action as the disjoint code cluster). In various instances, the microservices component's recommendation can be considered as a microservice decomposition strategy (e.g., the microservices component can highlight for a user/operator those portions of the source code of the monolithic application that can be replaced, and can further suggest which microservices should be obtained to replace those portions of the source code). In various aspects, the microservices component can actually perform and/or implement such decomposition strategies (e.g., the microservices component can render the disjoint code cluster inoperable, such as through automated deletion and/or commenting in the source code, and can schedule, order, and/or otherwise acquire the recommended microservice).

As mentioned above, existing systems/techniques that facilitate microservice decomposition and/or that recommend microservice decomposition strategies simply do not take into account data dependencies of the monolithic application (e.g., they use only the call graph of the application, not the code property graph), do not take into account how source code of the monolithic application has changed over time (e.g., they do not augment the code property graph based on the temporal code evolution at all), and do not identify and/or infer functional purposes/topics of detected code clusters by analyzing business documents associated with the monolithic application (e.g., they do not try to infer the functions performed by identified code clusters by leveraging user guides, GitHub files, code annotations, and so on).

Various embodiments of the invention can be used to help modernize large numbers of legacy applications that are not maintained actively but that are nonetheless commercially important to users/operators. Various instances of the invention can be used to help expedite migration to the cloud-native environment and to bring cost savings and/or performance improvements to users/operators. Various aspects of the invention can be used as part of an application management tool that helps to facilitate continuous code optimization and/or decomposition as needed. In various cases, embodiments of the invention can be considered as a modernization analysis engine that can identify potential portions of legacy source code that can and/or should be replaced by cloud-native microservices and that can recommend and/or identify which microservices should be chosen as replacements.

Various embodiments of the invention can be employed to use hardware and/or software to solve problems that are highly technical in nature (e.g., to facilitate automated recommendation of microservice decomposition strategies for monolithic applications), that are not abstract and that cannot be performed as a set of mental acts by a human. Further, some of the processes performed can be performed by a specialized computer (e.g., code property graph generator, community detector, topic modeler, and so on) for carrying out defined tasks related to automated recommendation of microservice decomposition strategies for monolithic applications (e.g., generating a code property graph characterizing a monolithic application based on source code of the monolithic application, augmenting the code property graph based on a temporal code evolution of the monolithic application, detecting a disjoint code cluster in the source code of the monolithic application based on the code property graph, identifying a functional purpose of the disjoint code cluster based on a business document corpus corresponding to the monolithic application, and so on). In various instances, embodiments of the invention can be employed to implement graph generation, community detection, and topic modeling techniques into a practical application that can provide technical improvements to and solve problems that arise in the field of automated recommendation of microservice decomposition strategies for monolithic applications. By leveraging both technical and business document sources, and by taking into account both data dependencies and code changes over time, embodiments of the invention can provide improved decomposition recommendations/strategies to users/operators of a monolithic application than can existing microservice decomposition systems. Such embodiments thus constitute a concrete and tangible technical improvement in the prior art.

FIG. 1 illustrates a block diagram of an example, non-limiting system 100 that can facilitate automated recommendation of microservice decomposition strategies for monolithic applications in accordance with one or more embodiments described herein. As shown, a microservice decomposition strategy system 102 can analyze a monolithic application 104 and can output as a result a recommendation regarding how the monolithic application 104 should be decomposed into microservices. More specifically, in various embodiments, the microservice decomposition strategy system 102 can detect one or more disjoint code clusters in source code of the monolithic application 104 (e.g., by analyzing a code property graph characterizing the monolithic application 104), can identify one or more functional purposes that respectively correspond to those one or more disjoint code clusters (e.g., one or more tasks, functions, capabilities, and/or actions facilitated by those one or more disjoint code clusters), and can recommend one or more microservices to respectively replace those one or more disjoint code clusters, based on the one or more functional purposes (e.g., a disjoint code cluster that facilitates a particular task, function, capability, and/or action can be replaced by a microservice that facilitates substantially the same task, function, capability, and/or action).

In various embodiments, the monolithic application 104 can be any suitable computer software program that exhibits a monolithic architecture, whether or not it qualifies as a legacy application.

In various embodiments, the monolithic application 104 can correspond to and/or be associated with a technical document corpus 106 and a business document corpus 108. Although the figures depict the technical document corpus 106 and the business document corpus 108 as being stored internally to the monolithic application 104, it is to be appreciated that this is exemplary, non-limiting, and for ease of illustration only. In various embodiments, the technical document corpus 106 and/or the business document corpus 108 can be stored separately and/or together in any suitable central and/or distributed fashions externally and/or internally to the monolithic application 104, as desired.

In various embodiments, the technical document corpus 106 can be a collection of documents representing and/or containing technical and/or coding information regarding the monolithic application 104. For example, in one or more embodiments, the technical document corpus 106 can include source files and/or source code files that correspond to the monolithic application 104, binary files and/or binary code files that correspond to the monolithic application 104, statistics of running instances of the monolithic application 104, deployment scripts corresponding to the monolithic application 104, information stored in code repositories corresponding to the monolithic application 104, a temporal code evolution (e.g., changes to source code over time) of the monolithic application 104, and so on.

In various embodiments, the business document corpus 108 can be a collection of documents (e.g., natural language documents, and so on) representing and/or containing business information, training information, troubleshooting information, explanatory/expository information, and/or non-technical information, and so on, regarding the monolithic application 104. For example, in one or more embodiments, the business document corpus 108 can include design documents corresponding to the monolithic application 104, user guides and/or user manuals corresponding to the monolithic application 104, training/troubleshooting guides and/or training/troubleshooting manuals corresponding to the monolithic application 104, README files and/or pages corresponding to the monolithic application 104, GitHub files and/or pages corresponding to the monolithic application 104, Wiki files and/or pages corresponding to the monolithic application 104, and so on.

In various embodiments, the microservice decomposition strategy system 102 can comprise a processor 110 (e.g., computer processing unit, microprocessor, and so on) and a computer-readable memory 112 that is operably connected to the processor 110. The memory 112 can store computer-executable instructions which, upon execution by the processor 110, can cause the processor 110 and/or other components of the microservice decomposition system 102 (e.g., graph component 114, community detection component 116, topic modeling component 118, microservices component 120, and so on) to perform one or more acts. In various embodiments, the memory 112 can store computer-executable components (e.g., graph component 114, community detection component 116, topic modeling component 118, microservices component 120, and so on), and the processor 110 can execute the computer-executable components.

In various embodiments, the microservice decomposition system 102 can comprise a graph component 114. In various aspects, the graph component 114 can analyze the technical document corpus 106 (e.g., analyze the source code and/or scripts of the monolithic application 104, and so on) and can accordingly generate a code property graph characterizing the monolithic application 104 based on the technical document corpus 106 (e.g., based on the source code and/or scripts of the monolithic application 104). In various instances, the graph component 114 can generate from the source code of the monolithic application 104 an abstract syntax tree, a control flow graph, and a program dependence graph, each encapsulating a different aspect of the structure and/or information flow of the monolithic application 104. In various cases, the graph component 114 can combine the abstract syntax tree, the control flow graph, and the program dependence graph into a single, joint data structure (e.g., the code property graph). In various aspects, the code property graph can be a multi-graph that simultaneously depicts the structure, the control flows, and the data dependencies of the monolithic application 104. In various instances, the graph component 114 can further augment and/or modify the code property graph based on a temporal code evolution of the monolithic application 104 (e.g., based on chronological records from a code repository detailing which portions of the source code of the monolithic application 104 experienced temporally-coinciding changes over time). In various cases, the augmented/modified code property graph (e.g., the nodes and edges in the augmented/modified code property graph) can be analyzed in order to determine which portions of the source code of the monolithic application 104 can and/or should be replaced with microservices.

In various embodiments, the microservice decomposition strategy system 102 can comprise a community detection component 116. In various aspects, the community detection component 116 can analyze the augmented/modified code property graph and can detect and/or identify one or more disjoint code clusters in the source code of the monolithic application 104. More specifically, the community detection component 116 can utilize graph theory techniques in order to detect one or more disjoint node clusters in the augmented/modified code property graph (e.g., a cluster of nodes in the graph that exhibit, via edge density, sufficiently high cohesiveness with each other and/or sufficiently low coupling with other clusters of nodes). Since the nodes and edges of the code property graph can correspond to and/or represent actual portions and/or lines of code in the source code of the monolithic application 104, the detection of disjoint node clusters in the code property graph can correspond to the detection of disjoint code clusters in the source code itself. In various cases, the community detection component 116 can facilitate such detection of disjoint code clusters via any suitable mathematical and/or statistical technique (e.g., Louvain algorithm, label propagation algorithm, connected components algorithm, strongly connected components algorithm, triangle counting algorithm, clustering coefficient algorithm, balanced triad algorithm, and so on).

In various embodiments, the microservice decomposition strategy system 102 can comprise a topic modeling component 118. In various aspects, the topic modeling component 118 can analyze the business document corpus 108 (e.g., analyze the design documents, user guides/manuals, and/or GitHub files, and so on) and can accordingly identify one or more functional purposes respectively corresponding to the one or more detected disjoint code clusters in the source code of the monolithic application 104. More specifically, the topic modeling component 118 can analyze the natural language text contained in the business document corpus 108 in order to determine a particular task, function, capability, and/or action performed and/or facilitated by each of the disjoint code clusters detected by the community detection component 116. For example, if the community detection component 116 detects three disjoint code clusters A, B, and C in the source code of the monolithic application 104, the topic modeling component 118 can analyze the business document corpus 108 in order to determine what each of the three disjoint code clusters A, B, and C do. In a non-limiting example, based on analyzing a user manual, a README file, and/or so on corresponding to the monolithic application 104, the topic modeling component 118 can determine and/or infer that the disjoint code cluster A facilitates a user authentication functionality, that the disjoint code cluster B facilitates a fault tolerance, validation, and/or fool-proofing functionality, and that the disjoint code cluster C facilitates a security screening functionality. In various cases, the topic modeling component 118 can facilitate such identification, determination, and/or inference of the functional purposes of the detected disjoint code clusters via any suitable mathematical and/or statistical technique (e.g., latent Dirichlet allocation algorithm, and so on).

In various embodiments, the microservice decomposition strategy system 102 can comprise a microservices component 120. In various aspects, the microservices component 120 can recommend one or more microservices to replace the one or more disjoint code clusters detected by the community detection component 116, based on the one or more functional purposes identified by the topic modeling component 118. In various cases, a disjoint code cluster that performs and/or facilitates a particular task, function, capability, and/or action can be replaced (e.g., decomposed) by a microservice that performs and/or facilitates substantially the same particular task, function, capability, and/or action. To continue the above example where the topic modeling component 118 determines that the disjoint code cluster A facilitates a user authentication functionality, the microservices component 120 can recommend that the disjoint code cluster A be replaced by a microservice that facilitates user authentication. Moreover, since the topic modeling component 118 determines that the disjoint code cluster B facilitates a fault tolerance, validation, and/or fool-proofing functionality, the microservices component 120 can recommend that the disjoint code cluster B be replaced by a microservice that facilitates fool-proofing. Furthermore, since the topic modeling component 118 determines that the disjoint code cluster C facilitates a security screening functionality, the microservices component 120 can recommend that the disjoint code cluster C be replaced by a microservice that facilitates security screening. In various embodiments, the microservices component 120 can not only recommend a decomposition strategy to the user/operator of the monolithic application 104, but can also implement such a decomposition strategy. To continue the above example, in various instances, the microservices component 120 can render inoperable the disjoint code cluster A in the source code of the monolithic application 104 (e.g., by automatically deleting and/or commenting out the lines of source code that comprise the disjoint code cluster A) and can automatically communicate with a provider/vendor of microservices to order, purchase, rent, and/or otherwise procure a microservice that facilitates user authentication. In various embodiments, the microservices component 120 can perform similar actions regarding the other disjoint code clusters (e.g., can render inoperable the disjoint code clusters B and C and can accordingly automatically communicate with a provider/vendor of microservices to order, purchase, rent, and/or otherwise procure microservices that facilitate fool-proofing and/or security screening).

As a high-level, non-limiting, and exemplary summary of FIG. 1, the monolithic application 104 can be a computer software program that is associated with a technical document corpus 106 (e.g., source code files, and so on) and a business document corpus 108 (e.g., user guides/manuals, README files, and so on). In various instances, the microservice decomposition strategy system 102 can receive as input the technical document corpus 106 and the business document corpus 108, and can produce as output a recommendation that identifies one or more microservices and that identifies the particular lines and/or portions of source code of the monolithic application 104 that can and/or should be replaced by those identified microservices. The microservice decomposition strategy system 102 can facilitate such recommendation by: (i) generating a code property graph that describes/characterizes the monolithic application 104; (ii) detecting candidates (e.g., disjoint code clusters) for microservice decomposition in the source code by performing community detection on the code property graph; (iii) identifying tasks/actions (e.g., functional purposes) performed by those detected candidates, and (iv) identifying and/or procuring microservices that perform/facilitate those identified tasks/actions. More specifically, the microservice decomposition strategy system 102 can generate, via the graph component 114, a code property graph that describes the structure, control flows, and data dependencies of the monolithic application 104. As explained above, the code property graph can be generated based on an automated analysis of the technical document corpus 106 (e.g., based on the source code). Based on this code property graph, the microservice decomposition strategy system 102 can detect, via the community detection component 116, one or more disjoint code clusters in the source code of the monolithic application 104. As mentioned above, the nodes and edges of the code property graph can correspond to and/or represent lines of code and/or portions of code in the source code of the monolithic application 104. Thus, detecting disjoint clusters of nodes in the code property graph via the community detection component 116 can correspond to detecting disjoint clusters of code in the source code itself. The microservice decomposition strategy system 102 can identify, via the topic modeling component 118, one or more functional purposes that are performed by the one or more disjoint code clusters of the monolithic application 104. As explained above, this can be based on an automated analysis of the business document corpus 108. Finally, the microservice decomposition strategy system 102 can recommend, by the microservices component 120, one or more microservices to replace the one or more disjoint code clusters, based on the one or more functional purposes (e.g., a disjoint code cluster that performs action X can be replaced by a microservice that performs action X).

Figure 2:
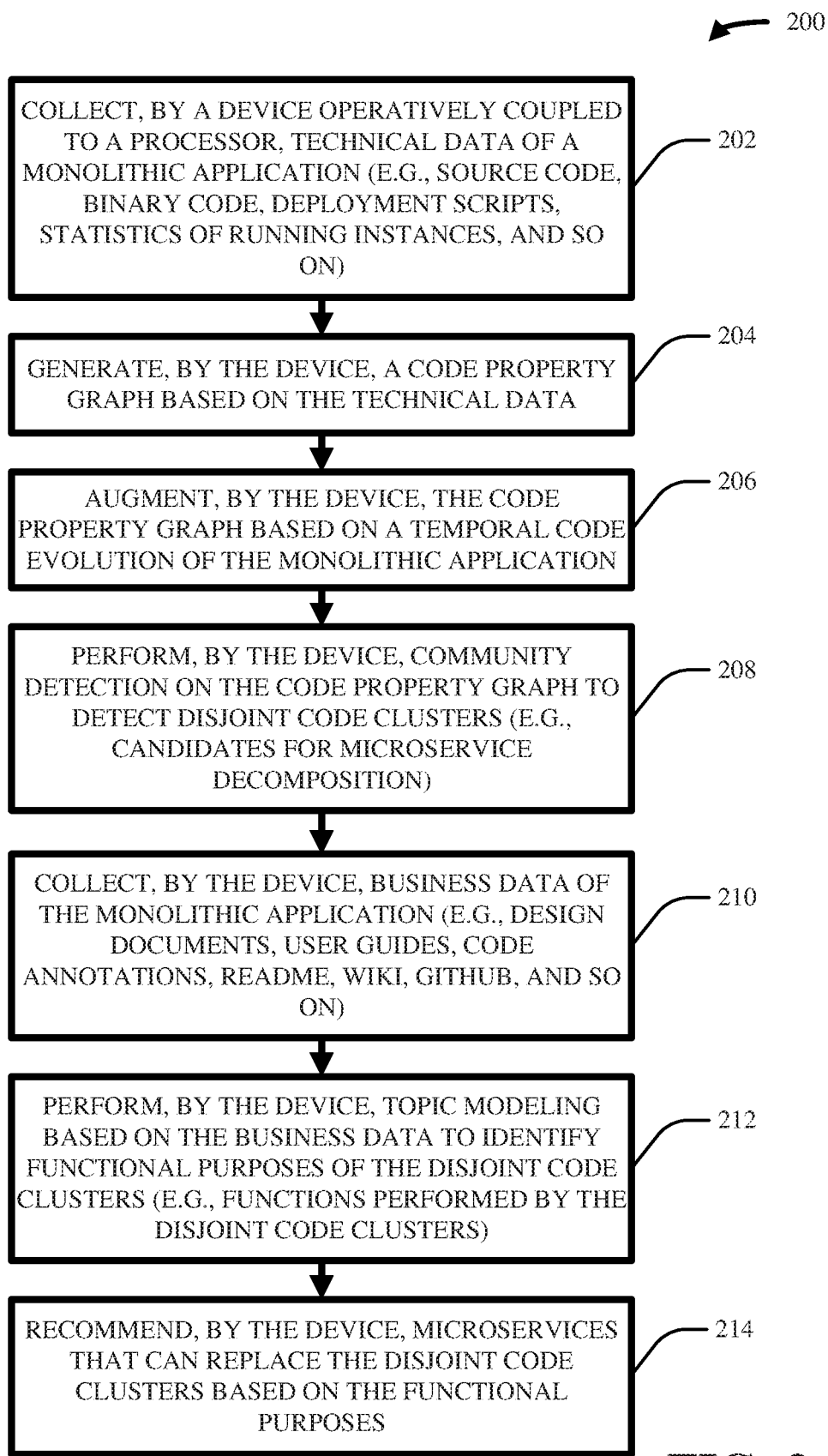
FIG. 2 illustrates a high-level flow diagram of an example, non-limiting computer-implemented method that facilitates automated recommendation of microservice decomposition strategies for monolithic applications in accordance with one or more embodiments described herein.

FIG. 2 illustrates a high-level flow diagram of an example, non-limiting computer-implemented method 200 that can facilitate automated recommendation of microservice decomposition strategies for monolithic applications in accordance with one or more embodiments described herein. In various embodiments, the computer-implemented method 200 can be performed by the system 100.

In various embodiments, act 202 can include collecting, by a device operatively coupled to a processor (e.g., by the graph component 114), technical data (e.g., the technical document corpus 106) of a monolithic application (e.g., the monolithic application 104). In various cases, the technical data can, for example, include source code, binary code, deployment scripts, statistics on running instances, different variants/configurations of the application, and so on.

In various instances, act 204 can include generating, by the device (e.g., by the graph component 114), a code property graph based on the technical data.

In various aspects, act 206 can include augmenting, by the device (e.g., by the graph component 114), the code property graph based on a temporal code evolution of the monolithic application (e.g., based on coinciding changes to the source code over time).

In various embodiments, act 208 can include performing, by the device (e.g., by the community detection component 116), community detection on the code property graph to detect disjoint code clusters in the source code of the monolithic application. In various cases, the disjoint code clusters can be considered as candidates for microservice decomposition (e.g., portions of source code that can potentially be replaced by microservices).

In various instances, act 210 can include collecting, by the device (e.g., by the topic modeling component 118), business data (e.g., the business document corpus 108) of the monolithic application. In various cases, the business data can, for example, include design documents, user guides, code annotations, README files, Wiki files, GitHub files, and so on.

In various aspects, act 212 can include performing, by the device (e.g., by the topic modeling component 118), topic modeling based on the business data to identify functional purposes of the disjoint code clusters (e.g., tasks, functions, capabilities, and/or actions performed by the disjoint code clusters).

In various embodiments, act 214 can include recommending, by the device (e.g., by the microservices component 120), microservices that can replace the disjoint code clusters based on the functional purposes (e.g., a disjoint code cluster that facilitates task Y can be replaced by a microservice that facilitates task Y).

Figure 3:
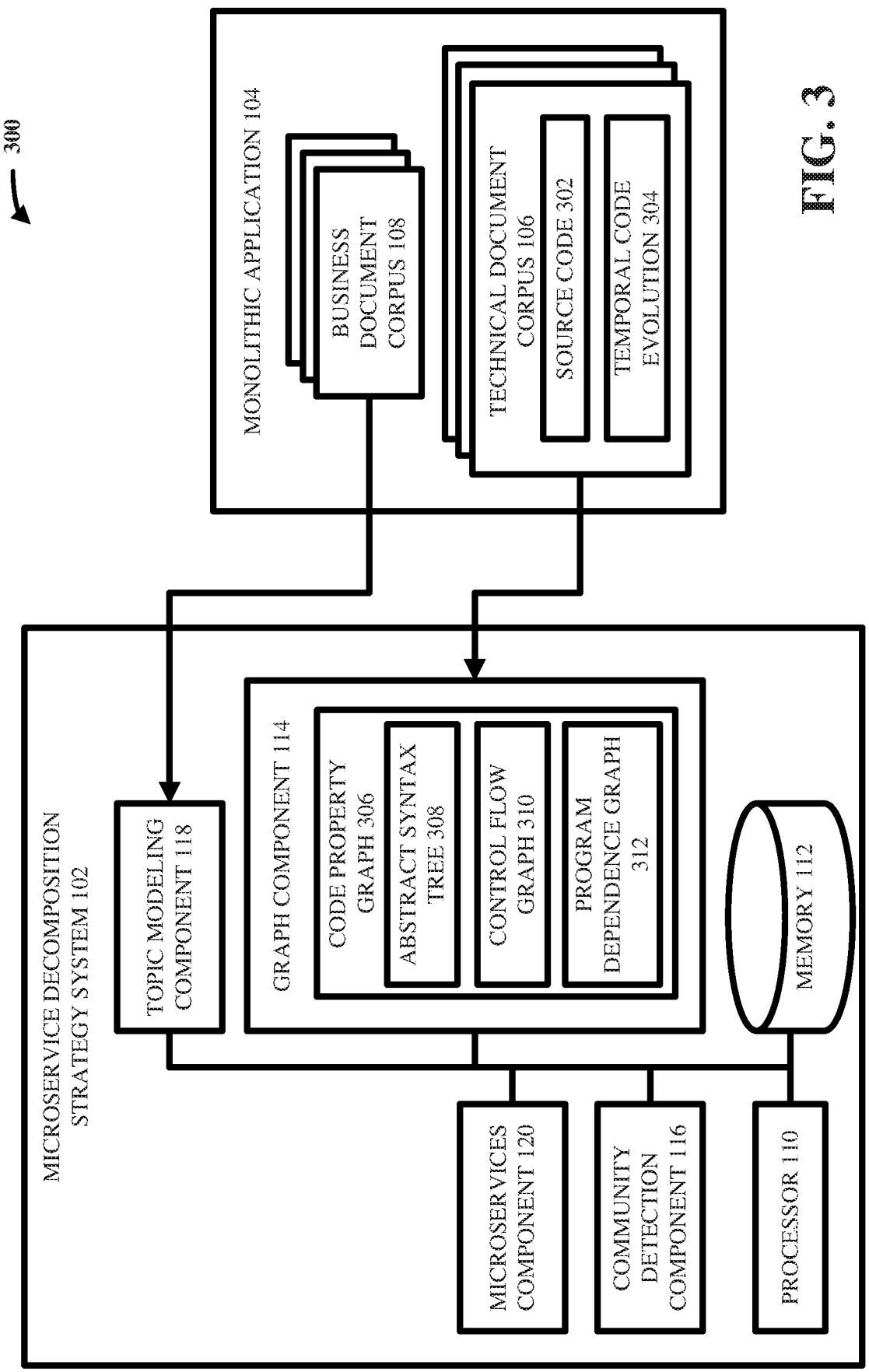
FIG. 3 illustrates a block diagram of an example, non-limiting system including a code property graph that facilitates automated recommendation of microservice decomposition strategies for monolithic applications in accordance with one or more embodiments described herein.

FIG. 3 illustrates a block diagram of an example, non-limiting system 300 including a code property graph that can facilitate automated recommendation of microservice decomposition strategies for monolithic applications in accordance with one or more embodiments described herein. As shown, the system 300 can, in various embodiments, include the same components as the system 100, and can further comprise a code property graph 306.

As shown, in various embodiments, the technical document corpus 106 can comprise a source code 302 and/or a temporal code evolution 304. In various instances, the source code 302 can be any suitable collection of computer code, with and/or without comments, written in any suitable, human-readable programming language (e.g., C, C++, Python, and so on) that specifies the computerized actions/functions to be performed by the monolithic application 104. In various embodiments, the source code 302 can be the programming scripts (e.g., containing for loops, if loops, while loops, function definitions, variable definitions and/or initializations, computations, and so on) that define the monolithic application 104.

In various embodiments, the graph component 114 can receive and/or analyze, via any suitable techniques known in the art, the source code 302, and can accordingly generate, via any suitable techniques known in the art, the code property graph 306 based on the source code 302. The code property graph 306 can, in various embodiments, be a combination of an abstract syntax tree 308, a control flow graph 310, and a program dependence graph 312, each corresponding to and/or characterizing the source code 302 of the monolithic application 104. In various instances, the abstract syntax tree 308 can be an ordered tree with inner nodes that represent operators (e.g., additions, assignments, and so on) and leaf nodes that represent operands (e.g., constants, identifiers, and so on). The abstract syntax tree 308 can encode and/or display how the statements and/or expressions in the source code 302 are nested. In various instances, the control flow graph 310 can explicitly describe and/or display the order in which code statements are executed and in which computational conditions need to be met in the source code 302. In various aspects, the control flow graph 310 can have nodes representing statements and/or predicates, which can be connected by edges to demonstrate transfer of control. In various instances, the program dependence graph 312 can explicitly represent dependencies among statements and predicates, and can depict and/or show all statements and/or predicates within the source code 302 that affect the value of any given variable at a specified statement. In various aspects, the program dependence graph 312 can have edges that represent data dependencies as well as edges that represent control dependencies. In various embodiments, the graph component 114 can generate the abstract syntax tree 308 based on the source code 302, can generate the control flow graph 310 based on the abstract syntax tree 308, and can generate the program dependence graph 312 based on the control flow graph 310, using any suitable techniques known in the art. In various aspects, the graph component 114 can combine the abstract syntax tree 308, the control flow graph 310, and the program dependence graph 312 into a single joint data structure (e.g., the code property graph 306) via any suitable techniques known in the art.

That is, in various embodiments, the graph component 114 can receive as input the source code 302 and can produce as output the code property graph 306 which can simultaneously depict the structure, the control flows, and the data dependencies of the source code 302. In various aspects, the code property graph 306 can contain nodes and/or edges representing different lines, portions, and/or segments of code in the source code 302. In various cases, the code property graph 306 can be analyzed (e.g., via graph theory techniques) in order to identify lines, portions, and/or segments of code in the source code 302 that are of interest (e.g., to detect candidates for microservice decomposition).

As explained above, the graph component 114 can, in various embodiments, modify and/or augment edge weights and/or properties of the code property graph 306 based on the temporal code evolution 304. In various instances, the temporal code evolution 304 can be any suitable document, timeline, and/or chronology that records, stores, and/or otherwise indicates past changes to the source code 302 over time. For example, suppose that the source code 302 contains code portion X (e.g., a first grouping of lines of code in the source code 302), code portion Y (e.g., a second grouping of lines of code in the source code 302), and code portion Z (e.g., a third grouping of lines of code in the source code 302). Then, the temporal code evolution 304 can be a document that indicates that, when the source code 302 was amended/updated in the past, the code portion X and the code portion Y have historically been changed at the same, substantially same, and/or similar times (e.g., changed on the same day). From this information, it can be inferred that the code portion X and the code portion Y are highly cohesive and/or tightly coupled together, or at least that they are more closely related to each other than they would be if they were historically changed at generally different times. So, during subsequent community detection, it can, in various cases, make sense for the code portion X and the code portion Y to be treated as a single disjoint code cluster rather than as two separate disjoint code clusters. Similarly, the temporal code evolution 304 can indicate that, when the source code 302 was amended/updated in the past, the code portion Y and the code portion Z have historically been changed at substantially different times (e.g., changed on different days). From this information, it can be inferred that the code portion Y and the code portion Z are not highly cohesive and/or not tightly coupled together, or at least that they are less closely related to each other than they would be if they were historically changed at generally the same time. So, during subsequent community detection, it can, in various cases, make sense for the code portion Y and the code portion Z to be grouped into separate disjoint code clusters, rather than being grouped into the same disjoint code cluster. In various embodiments, the graph component 114 can augment edge weights of the code property graph 306 to reflect such relatedness (e.g., increase edge weights between nodes representing code portion X and nodes representing code portion Y to reflect their higher relatedness, and decrease edge weights between nodes representing code portion Y and nodes representing code portion Z to reflect their lower relatedness). In some cases, the graph component 114 can add and/or subtract entire edges from the code property graph 306 altogether. In various instances, subsequent community detection can be improved and/or enhanced by such augmentation and/or modification of the code property graph 306 (e.g., the information from the temporal code evolution 304 can help to ensure that the source code 302 is accurately and/or sensibly clustered by the community detection component 116). In various instances, the temporal code evolution 304 can be stored in and/or obtained from one or more code repositories corresponding to the monolithic application 104.

Figure 4:
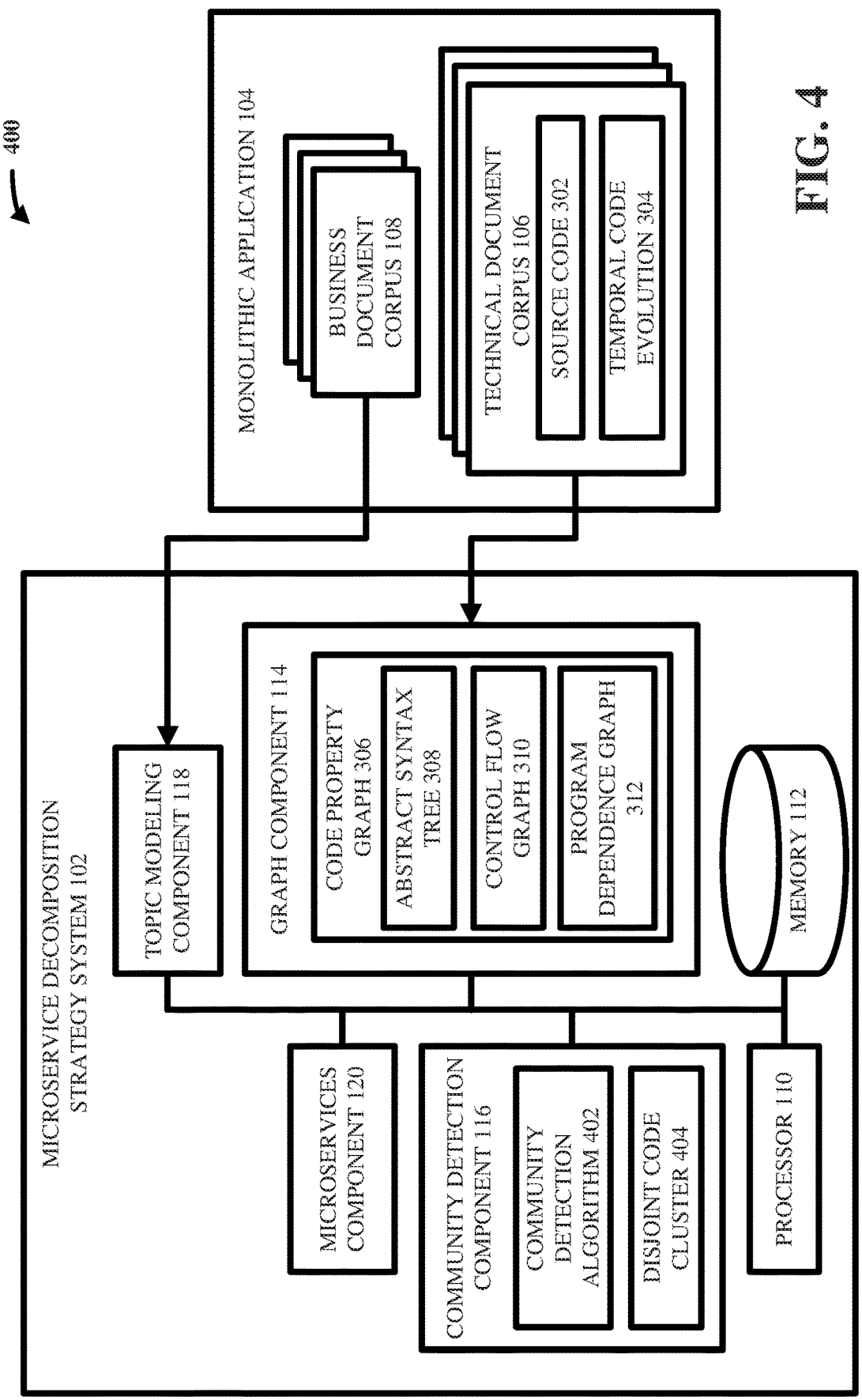
FIG. 4 illustrates a block diagram of an example, non-limiting system including a community detection algorithm that facilitates automated recommendation of microservice decomposition strategies for monolithic applications in accordance with one or more embodiments described herein.

FIG. 4 illustrates a block diagram of an example, non-limiting system 400 including a community detection algorithm that can facilitate automated recommendation of microservice decomposition strategies for monolithic applications in accordance with one or more embodiments described herein. As shown, the system 400 can, in various embodiments, comprise the same components as the system 300, and can further comprise a community detection algorithm 402.

In various embodiments, the community detection algorithm 402 can be any suitable machine learning, deep learning, and/or pattern recognition algorithm that can analyze the code property graph 306 and accordingly determine the disjointment and/or connectedness of the nodes in the code property graph 306, based on the edges connecting the nodes in the code property graph 306. Since the different nodes in the code property graph 306 can correspond to different portions of code in the source code 302, determining the disjointment and/or connectedness of the nodes in the code property graph 306 can correspond to determining the disjointment and/or connectedness of various portions of code in the source code 302. In other words, the community detection component 116 can analyze the code property graph 306 via the community detection algorithm 402, which can result in the detection and/or identification of various disjoint communities of nodes in the code property graph 306, which disjoint communities of nodes represent corresponding disjoint communities of code in the source code 302. In various cases, the disjoint code cluster 404 can be considered one of the detected/identified communities of code in the source code 302. In various instances, the disjoint code cluster 404 (and/or any other of the disjoint communities/clusters of code that are detected/identified) can be considered as a candidate for microservice decomposition (e.g., as a portion of the source code 302 that can potentially be replaced by a microservice).

In various embodiments, the community detection algorithm 402 can take parameters such as lower bound degree, community size, and so on. In various aspects, detected/identified communities can be potentially broken into finer-grained communities with customized parameters. In various instances, the community detection algorithm 402 can evaluate how a group (e.g., a group of nodes in the code property graph 306 representing a corresponding group of code in the source code 302) is clustered and/or partitioned, as well as its tendency to strengthen and/or break apart. In various embodiments, the community detection algorithm 402 can comprise any suitable mathematical and/or statistical technique for facilitating community detection (e.g., Louvain algorithm, Label Propagation algorithm, Connected Components algorithm, Strongly Connected Components algorithm, Triangle Counting algorithm, Clustering Coefficient Algorithm, Balanced Triads algorithm, and so on).

In various embodiments, other machine learning and/or artificial intelligence techniques can be implemented. Various embodiments of the present invention herein can employ artificial intelligence (AI) to facilitate automating one or more features of the present invention. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute, and so on) of the present invention, components of the present invention can examine the entirety or a subset of the data to which it is granted access and can provide for reasoning about or determine states of the system, environment, and so on from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed.

Classification as used herein also is inclusive of statistical regression that is utilized to develop models of priority.

Figure 5:
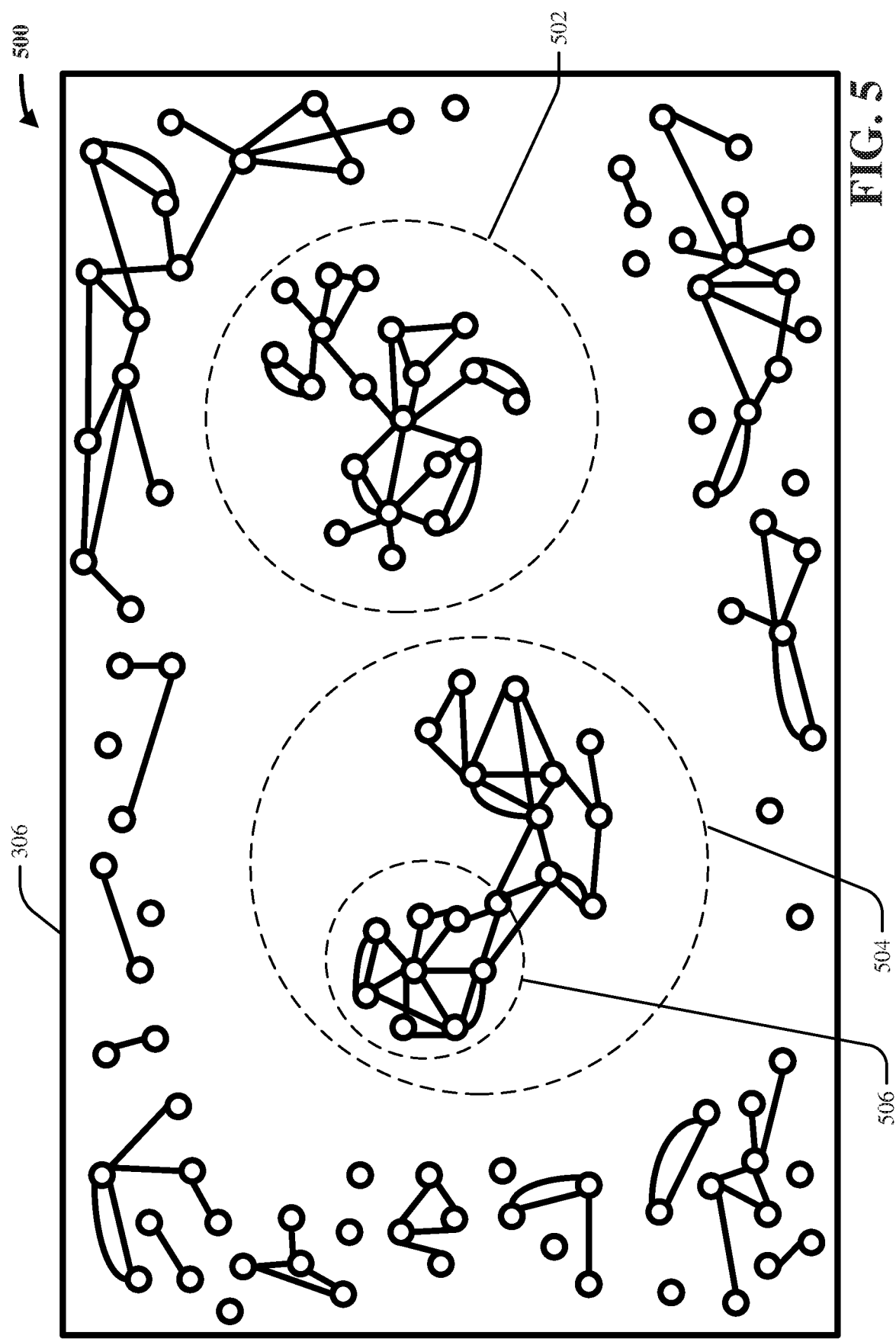
FIG. 5 illustrates a block diagram of an example, non-limiting disjoint code cluster in an example, non-limiting code property graph that facilitates automated recommendation of microservice decomposition strategies for monolithic applications in accordance with one or more embodiments described herein.

FIG. 5 illustrates a block diagram of an example, non-limiting disjoint code cluster in an example, non-limiting code property graph that can facilitate automated recommendation of microservice decomposition strategies for monolithic applications in accordance with one or more embodiments described herein.

FIG. 5 depicts an exemplary visual representation of the code property graph 306. As shown, the code property graph 306 can comprise numerous nodes (e.g., the small circles in FIG. 5) and numerous edges connecting the nodes (e.g., the straight and/or curved lines connecting the small circles in FIG. 5). As explained above, the community detection algorithm 402 can detect and/or identify disjoint clusters of nodes in the code property graph 306, which can respectively correspond to disjoint clusters of code in the source code 302. The disjoint clusters of nodes can be those communities of nodes that exhibit sufficiently high internal cohesiveness and sufficiently low external coupling (e.g., as measured by edge density). As shown, FIG. 5 depicts at least two disjoint clusters of nodes: node grouping 502 and node grouping 504. Grouping 502 is a community of nodes exhibiting high internal cohesiveness (e.g., all the nodes in the grouping 502 are directly and/or indirectly connected to each other) and low external coupling (e.g., the nodes in grouping 502 are not significantly connected directly and/or indirectly to nodes outside the grouping 502). For similar reasons, the nodes in the grouping 504 can also be considered a disjoint cluster of nodes. As mentioned above, these disjoint clusters of nodes can correspond to and/or represent disjoint code clusters in the source code 302 (e.g., the grouping 502 in the code property graph 306 can represent the disjoint code cluster 404 in the source code 302). In contrast, the grouping of nodes 506 can, in some cases, not be considered a disjoint cluster of nodes (and so the grouping of code in the source code 302 that corresponds to the grouping 506 would likely not be considered a disjoint code cluster and/or a candidate for microservice decomposition). This is because, although the nodes in the grouping 506 demonstrate high internal cohesiveness (e.g., they are significantly connected directly and/or indirectly with each other), they exhibit high external coupling as well (e.g., they are significantly connected to nodes outside of the grouping 506).

It will be appreciated that cohesiveness and/or coupling thresholds can be set as desired by the user/operator. Thus, in various embodiments, a grouping of nodes can be determined to exhibit sufficiently low coupling notwithstanding the fact that some nodes in the grouping have connections to nodes external to the grouping (e.g., in some cases, grouping 506 can be considered a disjoint cluster of nodes and thus can represent a corresponding disjoint code cluster, if the threshold defining maximum coupling rate is high enough).

Figure 6:
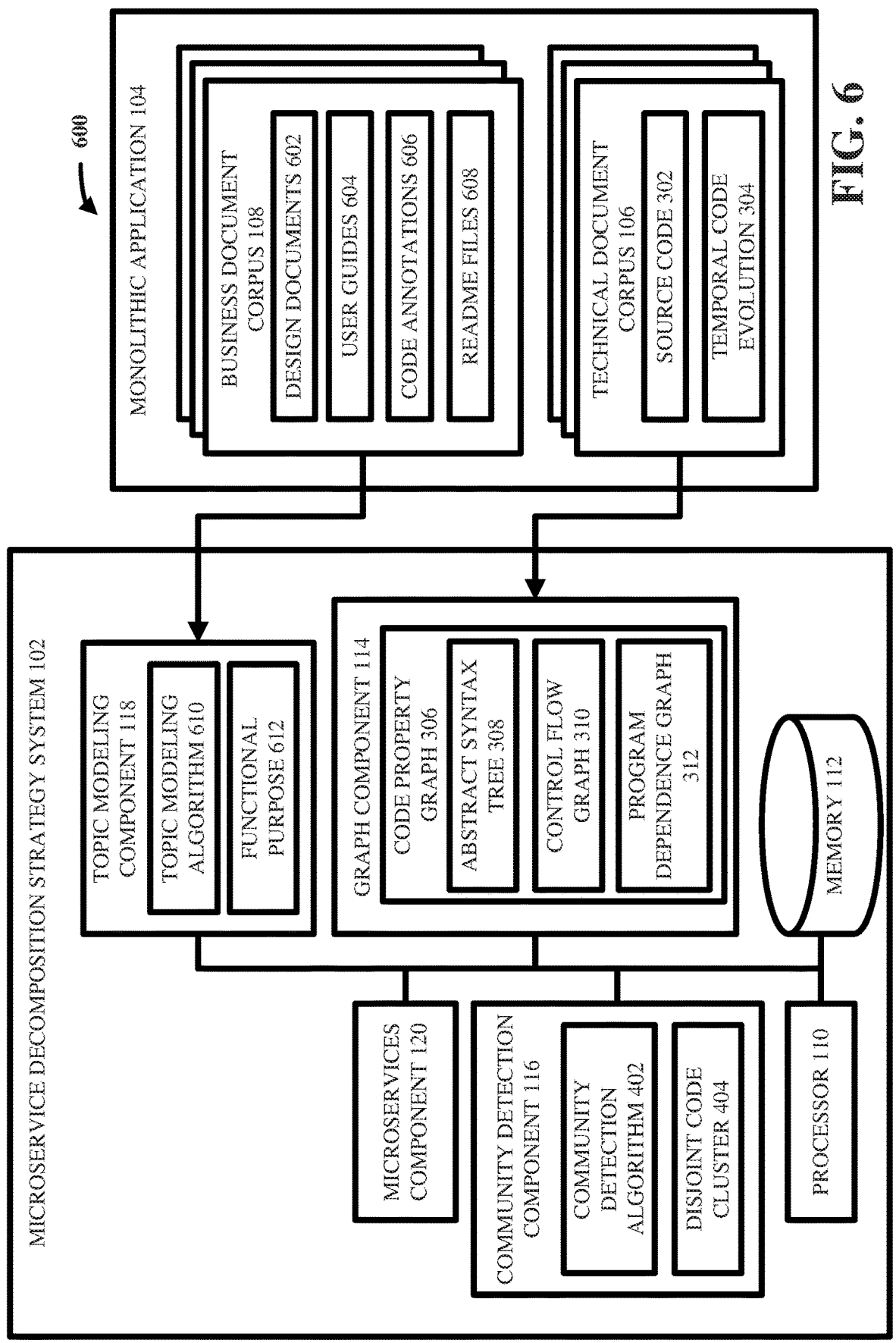
FIG. 6 illustrates a block diagram of an example, non-limiting system including a topic modeling algorithm that facilitates automated recommendation of microservice decomposition strategies for monolithic applications in accordance with one or more embodiments described herein.

FIG. 6 illustrates a block diagram of an example, non-limiting system 600 including a topic modeling algorithm that can facilitate automated recommendation of microservice decomposition strategies for monolithic applications in accordance with one or more embodiments described herein. As shown, the system 600 can, in various embodiments, comprise the same components as the system 400, and can further comprise a topic modeling algorithm 610.

As shown, the business document corpus 108 can, in various instances, comprise design documents 602, user guides 604, code annotations 606, README files 608, and/or any other suitable documents and/or files that contain information regarding the monolithic application 104 (e.g., Wiki files, GitHub files, training/troubleshooting manuals, and so on). In various aspects, the topic modeling algorithm 610 can be any suitable machine learning, deep learning, and/or pattern recognition algorithm that can analyze the business document corpus 108 and accordingly identify the functional purpose 612 corresponding to the disjoint code cluster 404. In various cases, the functional purpose 612 can be considered the primary task, function, capability, and/or action that is performed and/or facilitated by the disjoint code cluster 404 in the source code 302. For example, the functional purpose 612 can be user authentication, meaning that the disjoint code cluster 404 is the section of the source code 302 that authenticates a user of the monolithic application 104. As another example, the functional purpose 612 can be object detection, meaning that the disjoint code cluster 404 is the section of the source code 302 that performs object detection for the monolithic application 104. In various embodiments, the topic modeling algorithm 610 can comprise any suitable mathematical and/or statistical technique known in the art for determining functional topics/purposes (e.g., Latent Dirichlet Allocation algorithm (LDA), and so on).

LDA is a generative probabilistic model of a document corpus, where documents are represented as random mixtures over latent topics (e.g., business functions), where each topic is characterized by a distribution over data. In cases where LDA is implemented, feature extraction can be performed by the following: each data unit can be represented as a document by concatenating each attribute after stop words removal and tokenization; historical structure can be used to train the LDA model; and inference feature vectors from the code property graph 306 and the business document corpus 108 can be used to find out the business function of the disjoint code cluster 404. As a high-level, non-limiting summary, LDA is an algorithm for extracting features from the code property graph 306 and the business document corpus 108 in order to determine and/or infer the business functions performed by the communities/clusters identified in the code property graph 306. In various instances, a similarity measure can be established between the discovered functional purposes (e.g., topics) and business description (e.g., similarity between found topic and class).

Figure 7:
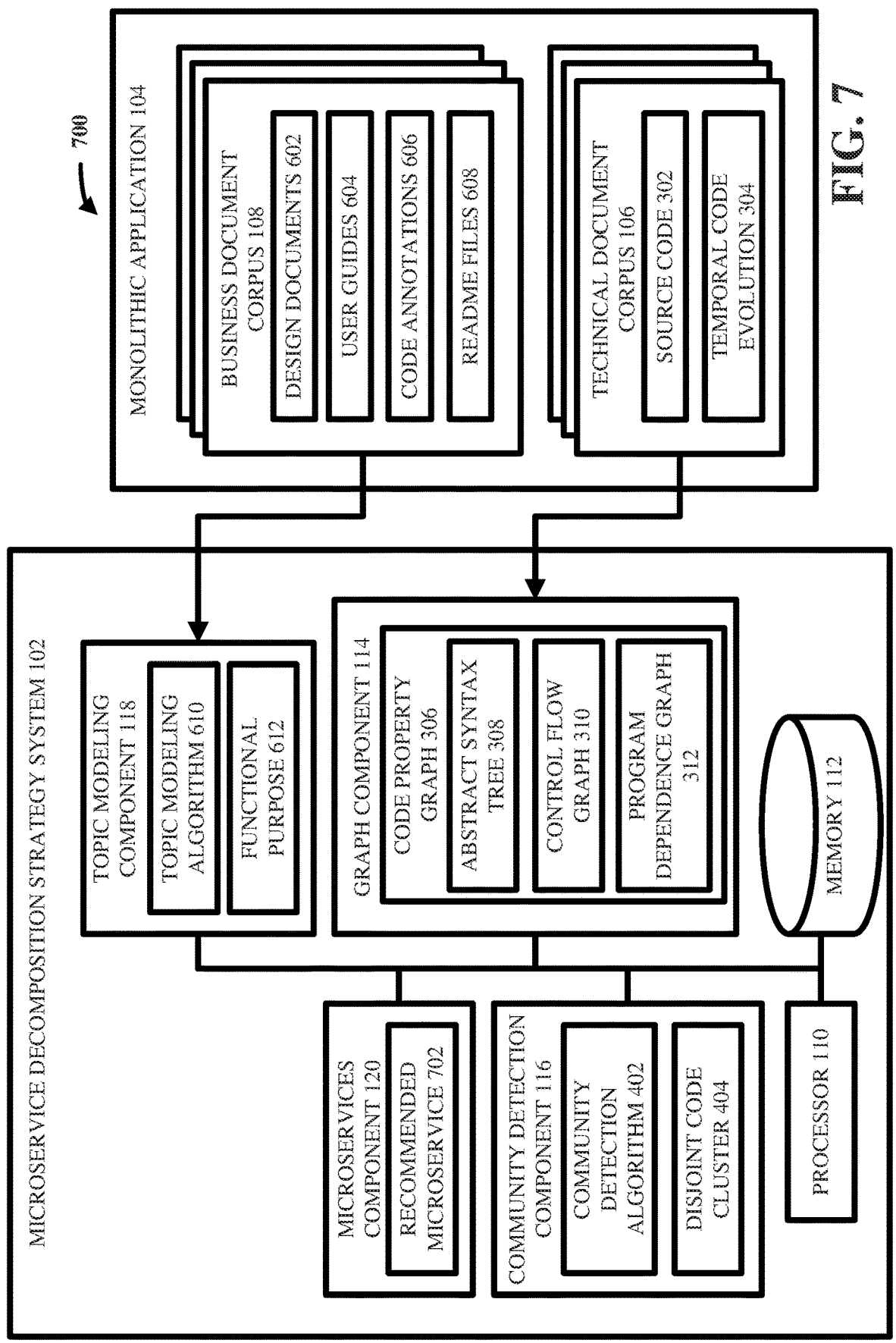
FIG. 7 illustrates a block diagram of an example, non-limiting system including a recommended microservice that facilitates automated recommendation of microservice decomposition strategies for monolithic applications in accordance with one or more embodiments described herein.

FIG. 7 illustrates a block diagram of an example, non-limiting system 700 including a recommended microservice that can facilitate automated recommendation of microservice decomposition strategies for monolithic applications in accordance with one or more embodiments described herein. As shown, the system 700 can, in various embodiments, comprise the same components as the system 600, and can further comprise a recommended microservice 702.

As shown in FIG. 7 and explained above, after the topic modeling component 118 identifies the functional purpose 612 of the disjoint code cluster 404 detected by the community detection component 116, the microservices component 120 can identify a particular microservice (e.g., from a database, directory, and/or list of available microservices) that can perform and/or facilitate the functional purpose 612. In various instances, the microservices component 120 can recommend (e.g., via electronic communication with a user/operator) the identified microservice (e.g., the recommended microservice 702) to replace the disjoint code cluster 404. In other words, since the recommended microservice 702 can perform the same task, function, capability, and/or action as the disjoint code cluster 404, the disjoint code cluster 404 can be successfully replaced by the recommended microservice 702. In various cases, the microservices component 120 can be considered as providing to the user/operator a recommended strategy for decomposing the monolithic application 104 (e.g., suggesting the replacement/substitution of the disjoint code cluster 404 with the recommended microservice 702). In various embodiments, the microservices component 120 can actually implement the recommended decomposition strategy, such as by rendering inoperable the disjoint code cluster 404 (e.g., via deletion and/or commenting out in the source code 302) and by scheduling, ordering, purchasing, renting, and/or otherwise procuring the recommended microservice 702 (e.g., from a microservices vendor). In various cases, the microservices component 120 can replace the disjoint code cluster 404 with the recommended microservice 702.

Figure 8:
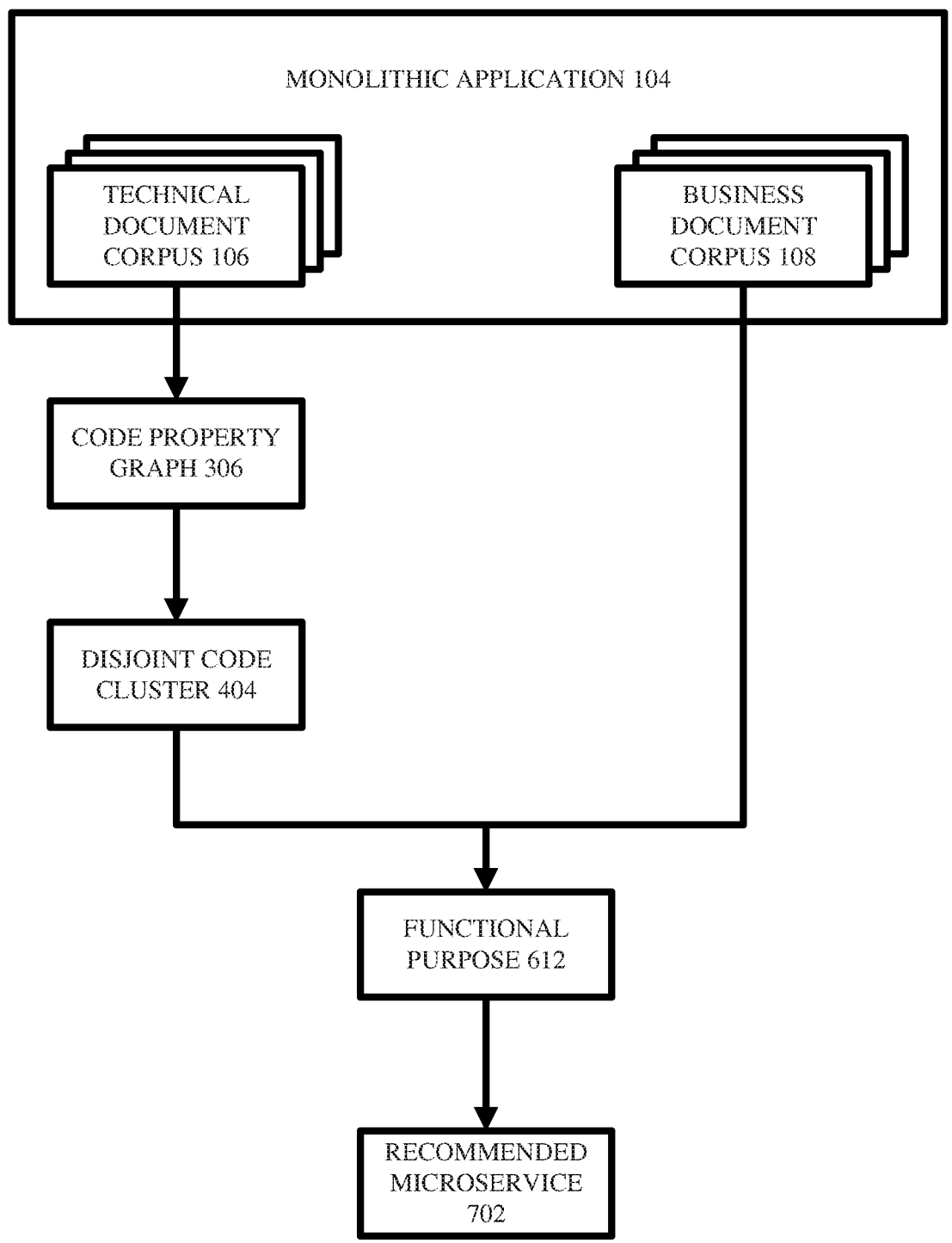
FIG. 8 illustrates a high-level block diagram that depicts an exemplary work-flow process for facilitating automated recommendation of microservice decomposition strategies for monolithic applications in accordance with one or more embodiments described herein.

FIG. 8 illustrates a high-level block diagram that depicts an exemplary work-flow process for facilitating automated recommendation of microservice decomposition strategies for monolithic applications in accordance with one or more embodiments described herein.

As shown, FIG. 8 depicts a high-level summary of various embodiments of the invention. The overall goal can be to decompose at least a portion of the monolithic application 104 into microservices. To do so, the technical document corpus 106 (e.g., source code 302, temporal code evolution 304, and so on) can be leveraged to create the code property graph 306, which can illustrate/exhibit the structure, control flows, and data dependencies inherent in the monolithic application 104. The code property graph 306 can be leveraged to identify/detect the disjoint code cluster 404, which can be considered as a candidate for microservice decomposition (e.g., a portion of the source code 302 that can potentially be replaced by a microservice). The business document corpus 108 can be leveraged to identify the functional purpose 612 corresponding to the disjoint code cluster 404 (e.g., the action/function performed by the disjoint code cluster 404). In various cases, a microservice that can perform/facilitate the functional purpose 612 can be recommended to replace the disjoint code cluster 404 (e.g., the recommended microservice 702 does the same job as the disjoint code cluster 404, and thus can replace the disjoint code cluster 404).

In this way, a recommendation/strategy for decomposing a large, cumbersome, monolithic computer program (e.g., the monolithic application 104) can be quickly and efficiently generated. As mentioned above, existing systems/techniques for facilitating microservice decomposition simply do not utilize code property graphs (e.g., they use only call graphs instead), do not utilize temporal code evolutions to inform the relatedness of various clusters of code, and do not utilize topic modeling of business documents to identify and/or infer functional purposes/topics of identified code clusters.

Figure 9:
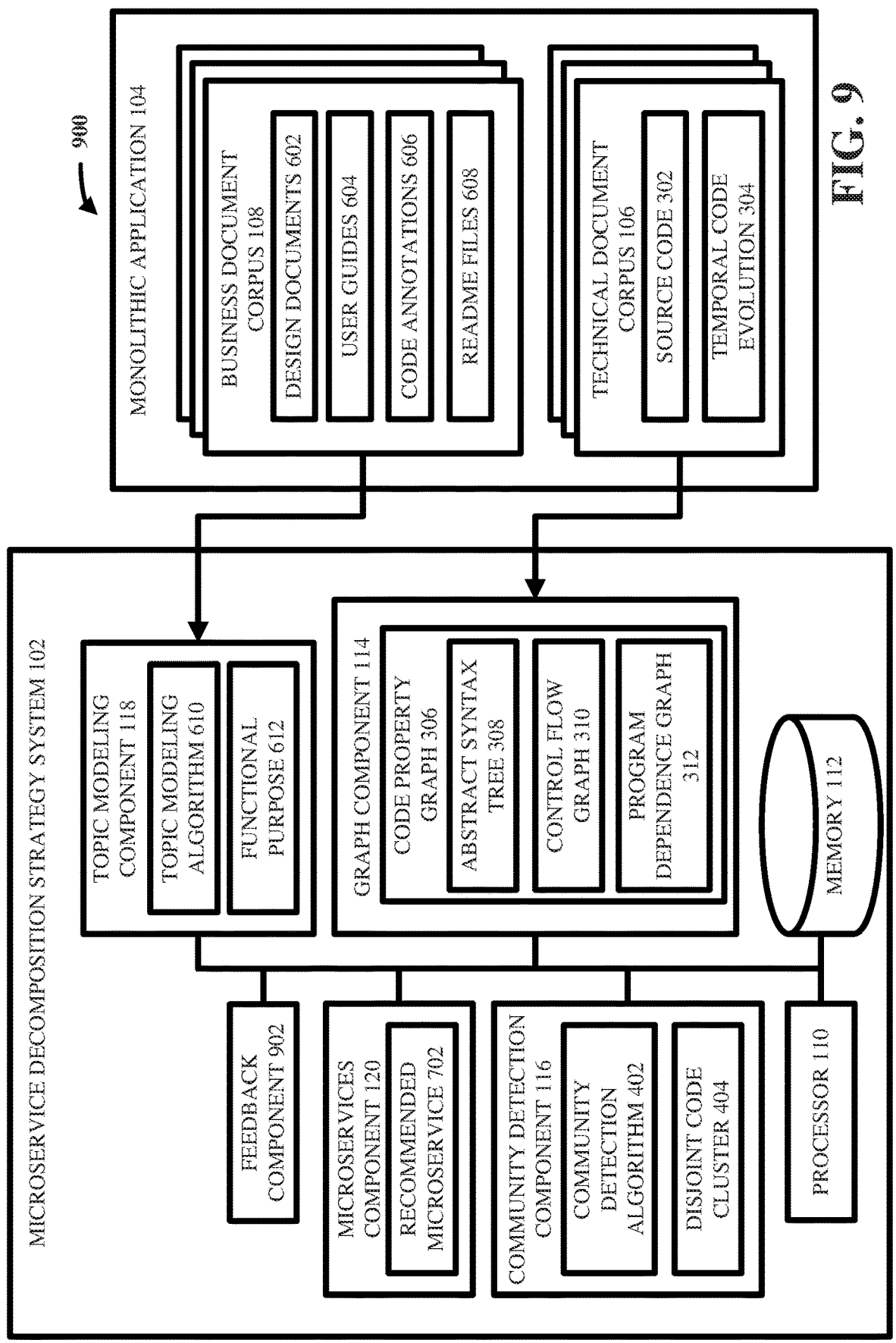
FIG. 9 illustrates a block diagram of an example, non-limiting system including a feedback component that facilitates automated recommendation of microservice decomposition strategies for monolithic applications in accordance with one or more embodiments described herein.

FIG. 9 illustrates a block diagram of an example, non-limiting system 900 including a feedback component that can facilitate automated recommendation of microservice decomposition strategies for monolithic applications in accordance with one or more embodiments described herein. As shown, the system 900 can, in various embodiments, comprise the same components as the system 700, and can further comprise the feedback component 902.

In various embodiments, the feedback component 902 can be any suitable human-computer interface that allows a user/operator (e.g., a subject matter expert, a code developer, and so on) to score, rate, grade, and/or otherwise provide feedback regarding the efficacy of the recommendations outputted by the microservice decomposition strategy system 102. In various cases, the feedback can be used to quantify how well or how poorly the microservice decomposition strategy system 102 clustered the source code 302 and/or identified/inferred the functional purpose 612. In various instances, the feedback component 902 can modify parameters (e.g., weights, biases, activation functions, and so on) of the community detection algorithm 402 and/or parameters of the topic modeling algorithm 610. In this way, the community detection component 116 and/or the topic modeling component 118 can learn from real-time and/or near-real-time feedback from users/operators. This can be considered an active learning methodology which enables the capture of human knowledge (e.g., capturing real-time clustering, topic modeling, and/or other decomposition insights from subject matter experts, which feedback can be learned to improve the accuracy and/or usefulness of the recommendations produced by the microservice decomposition strategy system 102). In other words, the feedback component 902 can facilitate a form of supervised learning/training of the microservice decomposition strategy system 102.

Figure 10:
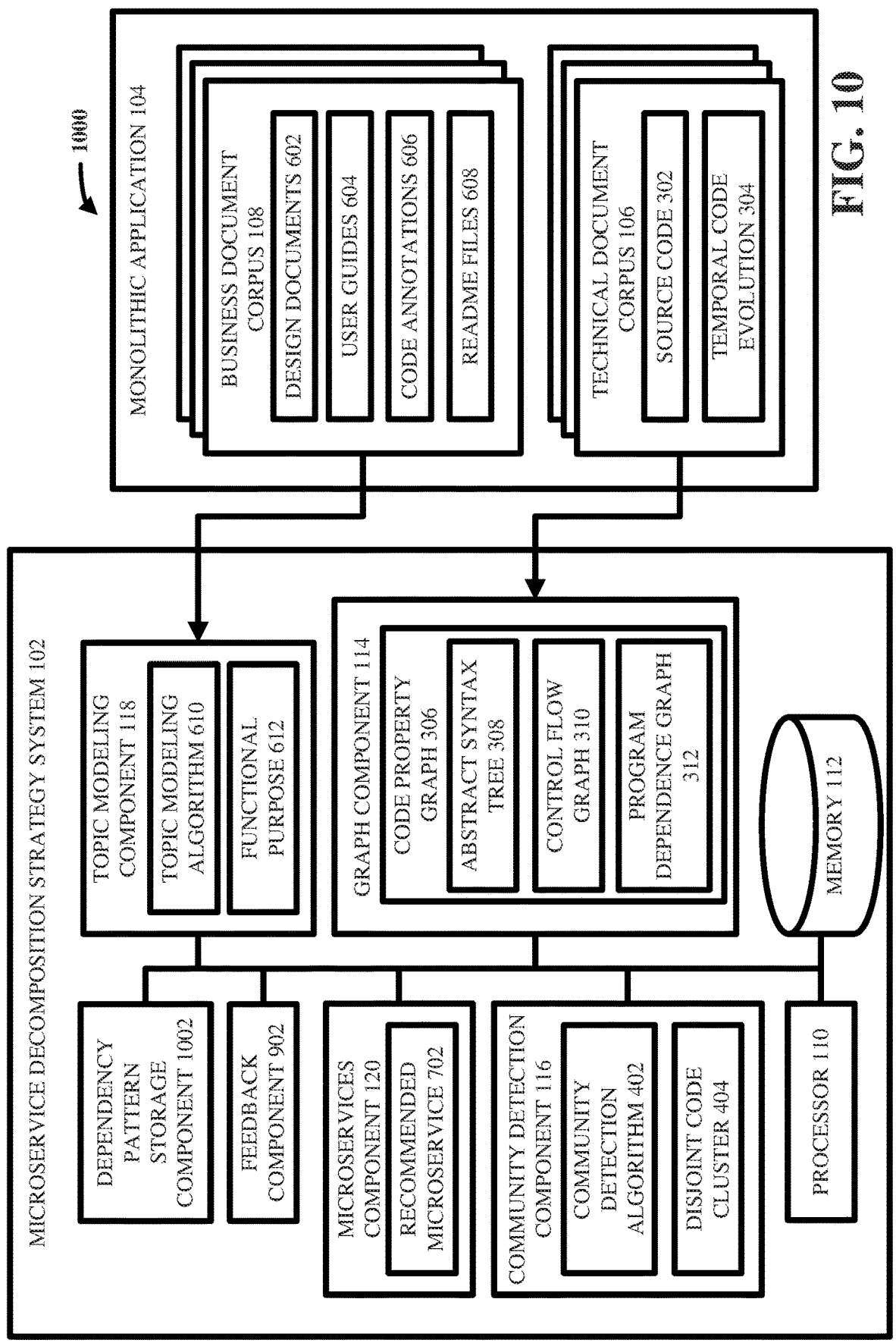
FIG. 10 illustrates a block diagram of an example, non-limiting system including a dependency pattern storage component that facilitates automated recommendation of microservice decomposition strategies for monolithic applications in accordance with one or more embodiments described herein.

FIG. 10 illustrates a block diagram of an example, non-limiting system 1000 including a dependency pattern storage component that can facilitate automated recommendation of microservice decomposition strategies for monolithic applications in accordance with one or more embodiments described herein. As shown, the system 1000 can, in various embodiments, comprise the same components as the system 900, and can further comprise the dependency pattern storage component 1002.

In various embodiments, the dependency pattern storage component 1002 can store dependency patterns learned from code property graphs of other monolithic applications, such that the community detection component 116 and the topic modeling component 118 can learn from the dependency patterns (e.g., can leverage the dependency patterns to more quickly and/or more accurately identify the disjoint code cluster 404 and/or the functional purpose 612). In various cases, the dependency patterns can be captured in the dependency pattern storage component 1002 and can be subsequently used to collect the repeatable patterns to identify the correct communities and/or the correct functional purposes/topics. That is, when the microservice decomposition strategy system 102 receives feedback and accordingly learns the proper community detection and topic modeling result for a given input code property graph (and/or portion of an input code property graph), a dependency pattern can be extracted from that input-result pair and stored in the dependency pattern storage component 1002. Then, the microservice decomposition strategy system 102 can leverage such stored dependency patterns when attempting to cluster and/or topic-model future applications. This can, in some cases, increase and/or improve performance of the system. If a level of match between a current code property graph and a dependency pattern (e.g., or between a current community in a current code property graph and a dependency pattern) is sufficiently high (e.g., threshold defined as desired by the user/operator), the microservice decomposition strategy system 102 can simply output the results stored in the dependency pattern storage component 1002 rather than spend the time and resources performing the community detection and/or topic modeling from scratch. In various embodiments, the level of match can be expressed as a probability value and/or similarity value based on a current edge density of a current code property graph or community in a code property graph as compared to an edge density exhibited by a stored dependency pattern. In various aspects, any suitable mathematical and/or statistical technique for comparing the current and stored dependency patterns can be used.

In various embodiments, any suitable breadth-first-search and/or depth-first-search algorithms can be used to explore all nodes in a graph (e.g., a code property graph) starting from some root node (e.g., where a REST API starts in the code) in order to facilitate learning/capturing dependency patterns. In various embodiments, any suitable algorithm known in the art for finding category-based groups (e.g., dependency patterns) in a code property graph can be implemented. In various embodiments, learning dependency patterns can be facilitated by any suitable algorithm that trains a multi-label support vector machine (and/or any other suitable classifiers) via a loss-reduction-based prediction method in order to identify categorical groups in a graph.

Figure 11:
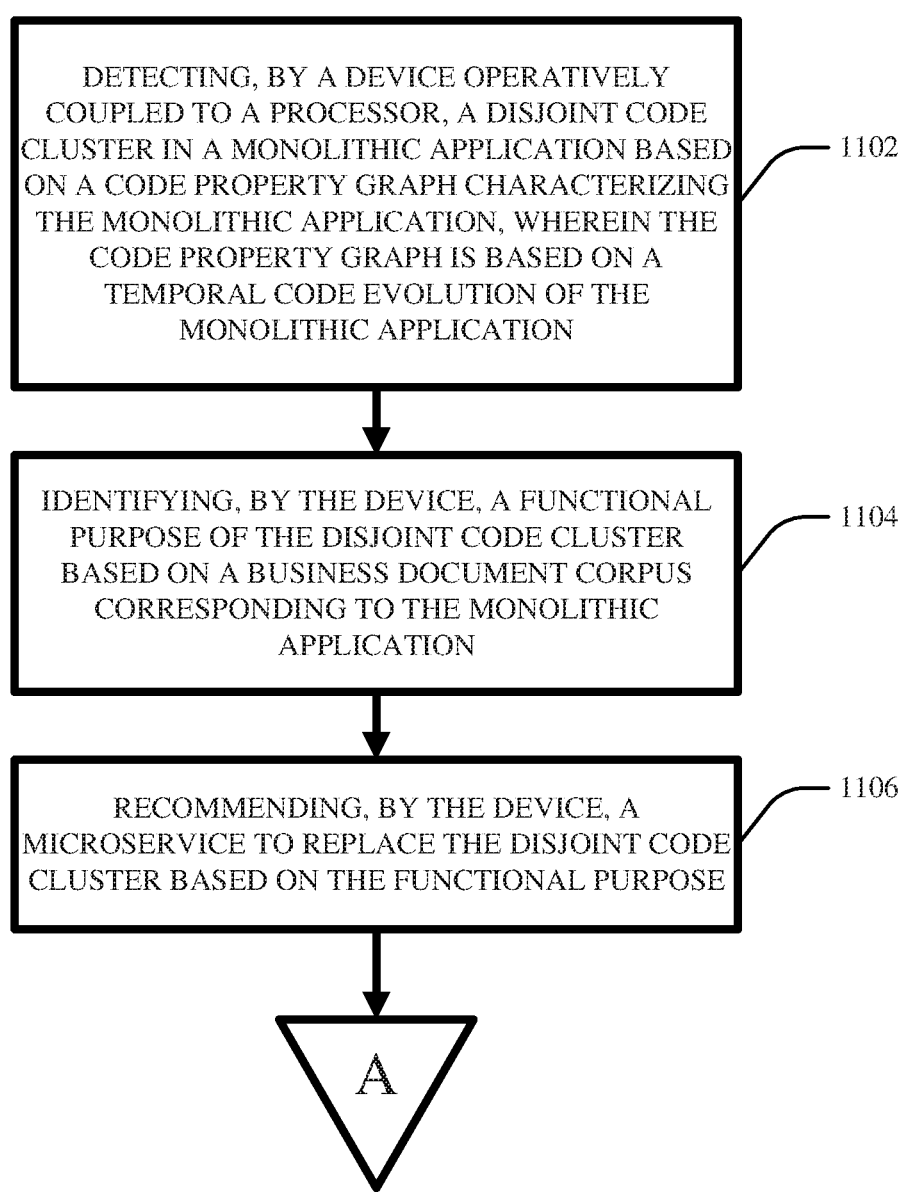
FIG. 11 illustrates a flow diagram of an example, non-limiting computer-implemented method that facilitates automated recommendation of microservice decomposition strategies for monolithic applications in accordance with one or more embodiments described herein.

FIG. 11 illustrates a flow diagram of an example, non-limiting computer-implemented method 1100 that can facilitate automated recommendation of microservice decomposition strategies for monolithic applications in accordance with one or more embodiments described herein.

In various embodiments, act 1102 can include detecting, by a device operatively coupled to a processor (e.g., 116), a disjoint code cluster (e.g., 404) in a monolithic application (e.g., 104) based on a code property graph (e.g., 306) characterizing the monolithic application, wherein the code property graph is based on a temporal code evolution (e.g., 304) of the monolithic application.

In various aspects, act 1104 can include identifying, by the device (e.g., 118), a functional purpose (e.g., 612) of the disjoint code cluster based on a business document corpus (e.g., 108) corresponding to the monolithic application.

In various instances, act 1106 can include recommending, by the device (e.g., 120), a microservice (e.g., 702) to replace the disjoint code cluster based on the functional purpose.

Figure 12:
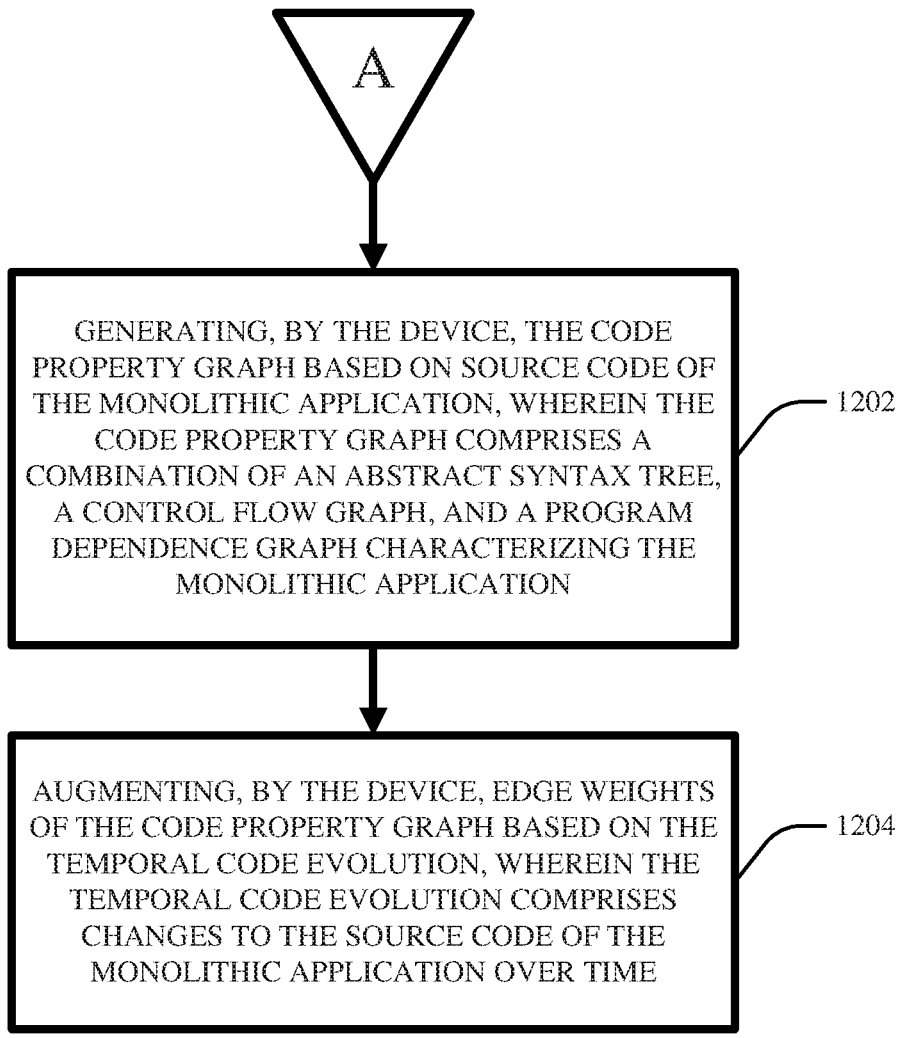
FIG. 12 illustrates a flow diagram of an example, non-limiting computer-implemented method including augmenting a code property graph that facilitates automated recommendation of microservice decomposition strategies for monolithic applications in accordance with one or more embodiments described herein.

FIG. 12 illustrates a flow diagram of an example, non-limiting computer-implemented method 1200 including augmenting a code property graph that can facilitate automated recommendation of microservice decomposition strategies for monolithic applications in accordance with one or more embodiments described herein. As shown, the computer-implemented method 1200 can, in various instances, comprise the same acts as the computer-implemented method 1100, and can further comprise acts 1202 and 1204.

In various embodiments, act 1202 can include generating, by the device (e.g., 114), the code property graph based on source code (e.g., 302) of the monolithic application, wherein the code property graph comprises a combination of an abstract syntax tree (e.g., 308), a control flow graph (e.g., 310), and a program dependence graph (e.g., 312) characterizing the monolithic application.

In various instances, act 1204 can include augmenting, by the device (e.g., 114), edge weights of the code property graph based on the temporal code evolution, wherein the temporal code evolution comprises changes to the source code of the monolithic application over time.

Figure 13:
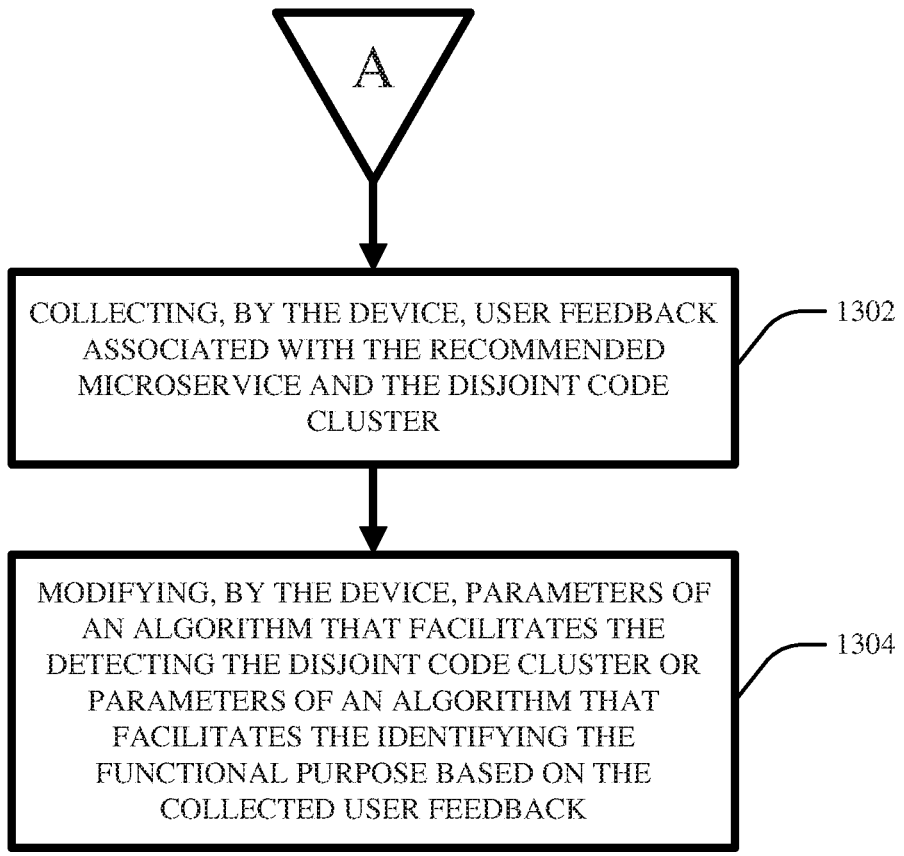
FIG. 13 illustrates a flow diagram of an example, non-limiting computer-implemented method including receiving user feedback that facilitates automated recommendation of microservice decomposition strategies for monolithic applications in accordance with one or more embodiments described herein.

FIG. 13 illustrates a flow diagram of an example, non-limiting computer-implemented method 1300 including receiving user feedback that can facilitate automated recommendation of microservice decomposition strategies for monolithic applications in accordance with one or more embodiments described herein. As shown, the computer-implemented method 1300 can, in various instances, comprise the same acts as the computer-implemented method 1100, and can further comprise acts 1302 and 1304.

In various embodiments, act 1302 can include collecting, by the device (e.g., 902), user feedback associated with the recommended microservice and the disjoint code cluster.

In various aspects, act 1304 can include modifying, by the device (e.g., 902), parameters of an algorithm (e.g., 402) that facilitates the detecting the disjoint code cluster or parameters of an algorithm (e.g., 610) that facilitates the identifying the functional purpose based on the collected user feedback.

Figure 14:
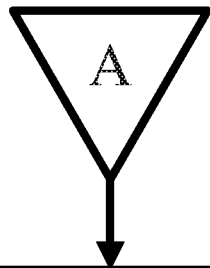
FIG. 14 illustrates a flow diagram of an example, non-limiting computer-implemented method including storing dependency patterns that facilitates automated recommendation of microservice decomposition strategies for monolithic applications in accordance with one or more embodiments described herein.

FIG. 14 illustrates a flow diagram of an example, non-limiting computer-implemented method 1400 including storing dependency patterns that can facilitate automated recommendation of microservice decomposition strategies for monolithic applications in accordance with one or more embodiments described herein. As shown, the computer-implemented method 1400 can, in various instances, comprise the same acts as the computer-implemented method 1100, and can further comprise act 1402.

In various embodiments, act 1402 can include storing, by the device (e.g., 1002), dependency patterns learned from code property graphs of other monolithic applications, wherein the dependency patterns facilitate the detecting the disjoint code cluster and the identifying the functional purpose.

Figure 15:
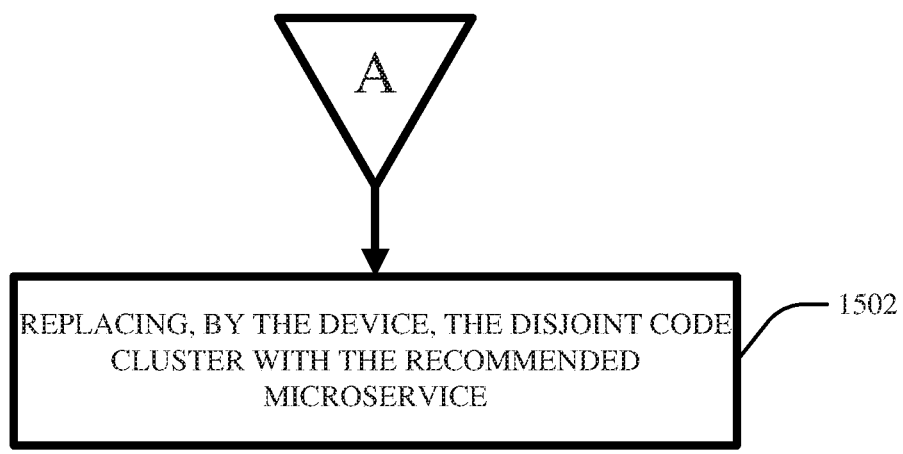
FIG. 15 illustrates a flow diagram of an example, non-limiting computer-implemented method including replacing disjoint code clusters that facilitates automated recommendation of microservice decomposition strategies for monolithic applications in accordance with one or more embodiments described herein.

FIG. 15 illustrates a flow diagram of an example, non-limiting computer-implemented method 1500 including replacing disjoint code clusters that can facilitate automated recommendation of microservice decomposition strategies for monolithic applications in accordance with one or more embodiments described herein. As shown, the computer-implemented method 1500 can, in various instances, comprise the same acts as the computer-implemented method 1100, and can further comprise acts 1502.

In various embodiments, act 1502 can include replacing, by the device (e.g., 120), the disjoint code cluster with the recommended microservice.

Figure 16:
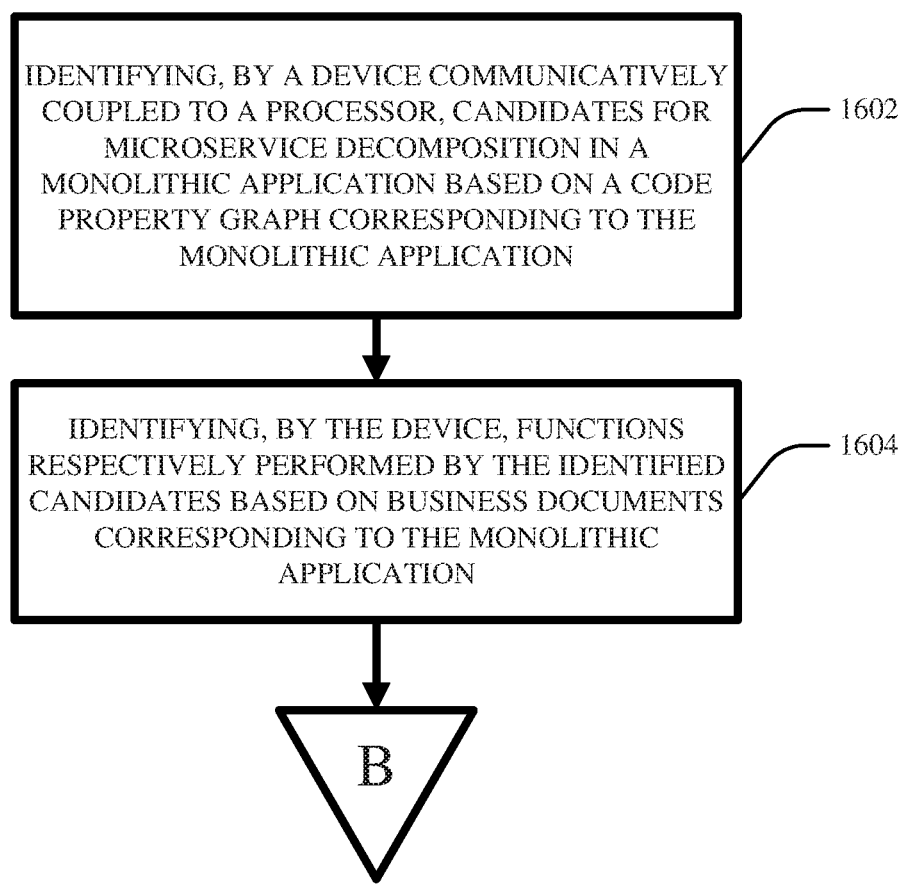
FIG. 16 illustrates a flow diagram of an example, non-limiting computer-implemented method that facilitates automated recommendation of microservice decomposition strategies for monolithic applications in accordance with one or more embodiments described herein.

FIG. 16 illustrates a flow diagram of an example, non-limiting computer-implemented method 1600 that can facilitate automated recommendation of microservice decomposition strategies for monolithic applications in accordance with one or more embodiments described herein.

In various embodiments, act 1602 can include identifying, by a device communicatively coupled to a processor (e.g., 116), candidates for microservice decomposition (e.g., 404) in a monolithic application (e.g., 104) based on a code property graph (e.g., 306) corresponding to the monolithic application.

In various aspects, act 1604 can include identifying, by the device (e.g., 118), functions (e.g., 612) respectively performed by the identified candidates based on business documents (e.g., 108) corresponding to the monolithic application.

Figure 17:
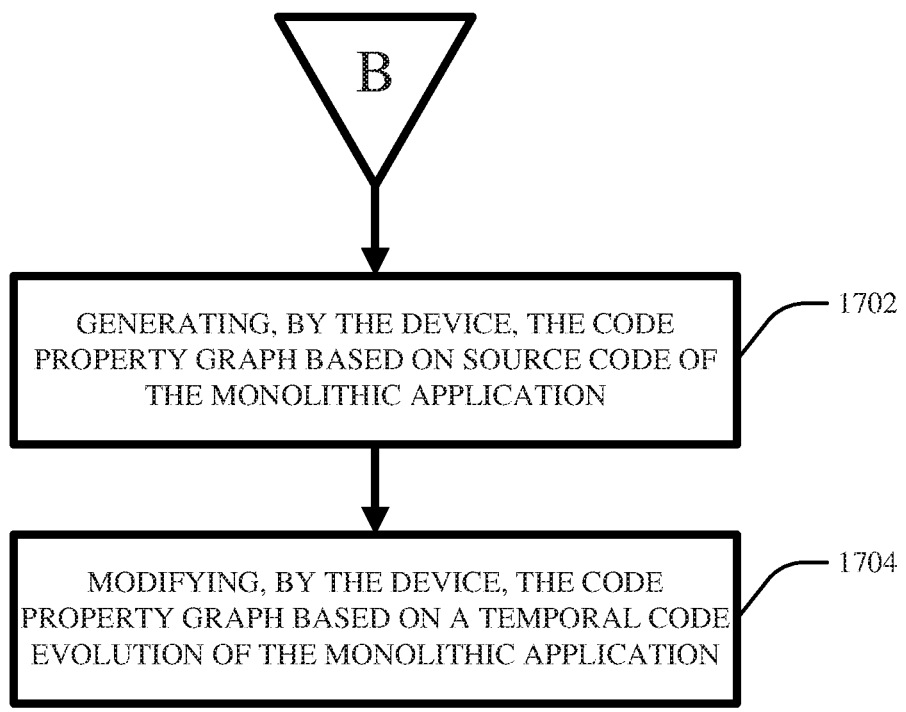
FIG. 17 illustrates a flow diagram of an example, non-limiting computer-implemented method including modifying a code property graph that facilitates automated recommendation of microservice decomposition strategies for monolithic applications in accordance with one or more embodiments described herein.

FIG. 17 illustrates a flow diagram of an example, non-limiting computer-implemented method 1700 including modifying a code property graph that can facilitate automated recommendation of microservice decomposition strategies for monolithic applications in accordance with one or more embodiments described herein. As shown, the computer-implemented method 1700 can, in various instances, comprise the same acts as the computer-implemented method 1600, and can further comprise acts 1702 and 1704.

In various embodiments, act 1702 can include generating, by the device (e.g., 114), the code property graph based on source code (e.g., 302) of the monolithic application.

In various aspects, act 1704 can include modifying, by the device (e.g., 114), the code property graph based on a temporal code evolution (e.g., 302) of the monolithic application.

Figure 18:
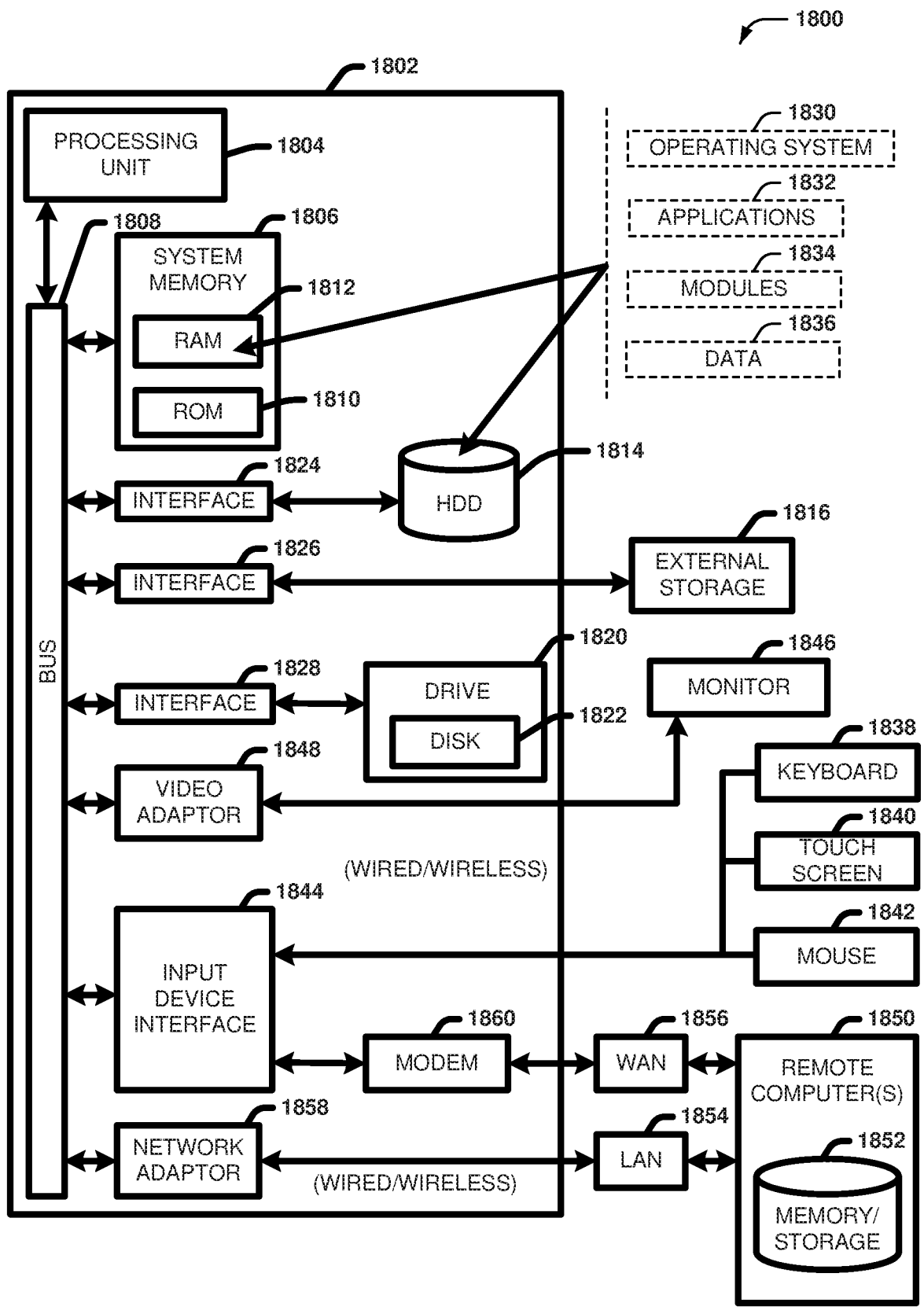
FIG. 18 illustrates a block diagram of an example, non-limiting operating environment in which one or more embodiments described herein can be facilitated.

In order to provide additional context for various embodiments described herein, FIG. 18 and the following discussion are intended to provide a brief, general description of a suitable computing environment 1800 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 18, the example environment 1800 for implementing various embodiments of the aspects described herein includes a computer 1802, the computer 1802 including a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors and other multi processor architectures can also be employed as the processing unit 1804.

The system bus 1808 can be any of several types of bus structure that can further interconnect to a memory bus (with or without a memory controller), a peripheral bus, and a local bus using any of a variety of commercially available bus architectures. The system memory 1806 includes ROM 1810 and RAM 1812. A basic input/output system (BIOS) can be stored in a non-volatile memory such as ROM, erasable programmable read only memory (EPROM), EEPROM, which BIOS contains the basic routines that help to transfer information between elements within the computer 1802, such as during startup. The RAM 1812 can also include a high-speed RAM such as static RAM for caching data.

The computer 1802 further includes an internal hard disk drive (HDD) 1814 (e.g., EIDE, SATA), one or more external storage devices 1816 (e.g., a magnetic floppy disk drive (FDD) 1816, a memory stick or flash drive reader, a memory card reader, etc.) and a drive 1820, e.g., such as a solid state drive, an optical disk drive, which can read or write from a disk 1822, such as a CD-ROM disc, a DVD, a BD, etc. Alternatively, where a solid state drive is involved, disk 1822 would not be included, unless separate. While the internal HDD 1814 is illustrated as located within the computer 1802, the internal HDD 1814 can also be configured for external use in a suitable chassis (not shown). Additionally, while not shown in environment 1800, a solid state drive (SSD) could be used in addition to, or in place of, an HDD 1814. The HDD 1814, external storage device(s) 1816 and drive 1820 can be connected to the system bus 1808 by an HDD interface 1824, an external storage interface 1826 and a drive interface 1828, respectively. The interface 1824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1812, including an operating system 1830, one or more application programs 1832, other program modules 1834 and program data 1836. All or portions of the operating system, applications, modules, and/or data can also be cached in the RAM 1812. The systems and methods described herein can be implemented utilizing various commercially available operating systems or combinations of operating systems.

Computer 1802 can optionally comprise emulation technologies. For example, a hypervisor (not shown) or other intermediary can emulate a hardware environment for operating system 1830, and the emulated hardware can optionally be different from the hardware illustrated in FIG. 18. In such an embodiment, operating system 1830 can comprise one virtual machine (VM) of multiple VMs hosted at computer 1802. Furthermore, operating system 1830 can provide runtime environments, such as the Java runtime environment or the .NET framework, for applications 1832. Runtime environments are consistent execution environments that allow applications 1832 to run on any operating system that includes the runtime environment. Similarly, operating system 1830 can support containers, and applications 1832 can be in the form of containers, which are lightweight, standalone, executable packages of software that include, e.g., code, runtime, system tools, system libraries and settings for an application.

Further, computer 1802 can be enable with a security module, such as a trusted processing module (TPM). For instance with a TPM, boot components hash next in time boot components, and wait for a match of results to secured values, before loading a next boot component. This process can take place at any layer in the code execution stack of computer 1802, e.g., applied at the application execution level or at the operating system (OS) kernel level, thereby enabling security at any level of code execution.

A user can enter commands and information into the computer 1802 through one or more wired/wireless input devices, e.g., a keyboard 1838, a touch screen 1840, and a pointing device, such as a mouse 1842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1804 through an input device interface 1844 that can be coupled to the system bus 1808, but can be connected by other interfaces, such as a parallel port, an IEEE 1394 serial port, a game port, a USB port, an IR interface, a BLUETOOTH® interface, etc.

A monitor 1846 or other type of display device can be also connected to the system bus 1808 via an interface, such as a video adapter 1848. In addition to the monitor 1846, a computer typically includes other peripheral output devices (not shown), such as speakers, printers, etc.

The computer 1802 can operate in a networked environment using logical connections via wired and/or wireless communications to one or more remote computers, such as a remote computer(s) 1850. The remote computer(s) 1850 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1852 is illustrated. The logical connections depicted include wired/wireless connectivity to a local area network (LAN) 1854 and/or larger networks, e.g., a wide area network (WAN) 1856. Such LAN and WAN networking environments are commonplace in offices and companies, and facilitate enterprise-wide computer networks, such as intranets, all of which can connect to a global communications network, e.g., the Internet.

When used in a LAN networking environment, the computer 1802 can be connected to the local network 1854 through a wired and/or wireless communication network interface or adapter 1858. The adapter 1858 can facilitate wired or wireless communication to the LAN 1854, which can also include a wireless access point (AP) disposed thereon for communicating with the adapter 1858 in a wireless mode.

When used in a WAN networking environment, the computer 1802 can include a modem 1860 or can be connected to a communications server on the WAN 1856 via other means for establishing communications over the WAN 1856, such as by way of the Internet. The modem 1860, which can be internal or external and a wired or wireless device, can be connected to the system bus 1808 via the input device interface 1844. In a networked environment, program modules depicted relative to the computer 1802 or portions thereof, can be stored in the remote memory/storage device 1852. It will be appreciated that the network connections shown are example and other means of establishing a communications link between the computers can be used.

When used in either a LAN or WAN networking environment, the computer 1802 can access cloud storage systems or other network-based storage systems in addition to, or in place of, external storage devices 1816 as described above, such as but not limited to a network virtual machine providing one or more aspects of storage or processing of information. Generally, a connection between the computer 1802 and a cloud storage system can be established over a LAN 1854 or WAN 1856 e.g., by the adapter 1858 or modem 1860, respectively. Upon connecting the computer 1802 to an associated cloud storage system, the external storage interface 1826 can, with the aid of the adapter 1858 and/or modem 1860, manage storage provided by the cloud storage system as it would other types of external storage. For instance, the external storage interface 1826 can be configured to provide access to cloud storage sources as if those sources were physically connected to the computer 1802.

The computer 1802 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a standalone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has,"

"possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer-executable components; and
   a processor, operably coupled to the memory, that executes the computer-executable components stored in the memory, wherein the computer-executable components comprise:
      a community detection component that detects a disjoint code cluster in a monolithic application based on a code property graph characterizing the monolithic application, wherein the code property graph is generated based on an analysis of a temporal code evolution of the monolithic application that identifies groups of changes to source code of the monolithic application that occur in respective defined time periods;
      a topic modeling component that identifies a functional purpose of the disjoint code cluster based on a business document corpus corresponding to the monolithic application; and
      a microservices component that recommends a microservice to replace the disjoint code cluster based on the functional purpose.

2. The system of claim 1, wherein the business document corpus includes at least one from a group consisting of a design document, a user guide, a code annotation, a wiki-document, a github-document, and a readme-document corresponding to the monolithic application.

3. The system of claim 1, wherein the code property graph is a multi-graph that concurrently depicts structure of the source code, control flows in the source code, and data dependencies in the source code.

4. The system of claim 1, further comprising:
   a graph component that:
      generates the code property graph based on source code of the monolithic application, wherein the code property graph comprises a combination of an abstract syntax tree, a control flow graph, and a program dependence graph characterizing the monolithic application; and
      augments edge weights of the code property graph based on the temporal code evolution, wherein the temporal code evolution comprises the changes to the source code of the monolithic application over time.

5. The system of claim 1, wherein the topic modeling component identifies the functional purpose of the disjoint code cluster by employing a Latent Dirichlet Allocation algorithm.

6. The system of claim 1, further comprising:
   a feedback component that collects user feedback associated with the recommended microservice and the disjoint code cluster, wherein the feedback component modifies parameters of the community detection component or parameters of the topic modeling component based on the collected user feedback.

7. The system of claim 1, further comprising:
   a dependency pattern storage component that stores dependency patterns learned from code property graphs of other monolithic applications, wherein the community detection component and the topic modeling component leverage the dependency patterns to identify the disjoint code cluster and the functional purpose.

8. The system of claim 1, wherein the microservices component replaces the disjoint code cluster with the recommended microservice.

9. A computer-implemented method, comprising:
   detecting, by a device operatively coupled to a processor, a disjoint code cluster in a monolithic application based on a code property graph characterizing the monolithic application, wherein the code property graph is generated based on an analysis of a temporal code evolution of the monolithic application that identifies groups of code changes of the monolithic application that occur in respective defined time periods;
   identifying, by the device, a functional purpose of the disjoint code cluster based on a business document corpus corresponding to the monolithic application; and
   recommending, by the device, a microservice to replace the disjoint code cluster based on the functional purpose.

10. The computer-implemented method of claim 9, wherein the business document corpus includes at least one from a group consisting of a design document, a user guide, a code annotation, a wiki-document, a github-document, and a readme-document corresponding to the monolithic application.

11. The computer-implemented method of claim 9, wherein the code property graph is a multi-graph that concurrently depicts structure of the source code, control flows in the source code, and data dependencies in the source code.

12. The computer-implemented method of claim 9, further comprising:
   generating, by the device, the code property graph based on source code of the monolithic application, wherein the code property graph comprises a combination of an abstract syntax tree, a control flow graph, and a program dependence graph characterizing the monolithic application; and
   augmenting, by the device, edge weights of the code property graph based on the temporal code evolution, wherein the temporal code evolution comprises the changes to the source code of the monolithic application over time.

13. The computer-implemented method of claim 9, wherein the identifying the functional purpose of the disjoint code cluster employs a Latent Dirichlet Allocation algorithm.

14. The computer-implemented method of claim 9, further comprising:
   collecting, by the device, user feedback associated with the recommended microservice and the disjoint code cluster; and
   modifying, by the device, parameters of an algorithm that facilitates the detecting the disjoint code cluster or parameters of an algorithm that facilitates the identifying the functional purpose based on the collected user feedback.

15. The computer-implemented method of claim 9, further comprising:
storing, by the device, dependency patterns learned from code property graphs of other monolithic applications, wherein the dependency patterns facilitate the detecting the disjoint code cluster and the identifying the functional purpose.

16. The computer-implemented method of claim 9, further comprising:
replacing, by the device, the disjoint code cluster with the recommended microservice.

17. A computer program product for facilitating automated recommendation of microservice decomposition strategies for monolithic applications, the computer program product comprising a computer readable memory having program instructions embodied therewith, the program instructions executable by a processing component to cause the processing component to:
detect a disjoint code cluster in a monolithic application based on a code property graph characterizing the monolithic application, wherein the code property graph is generated based on an analysis of a temporal code evolution of the monolithic application that identifies groups of code changes of the monolithic application that occur in respective defined time periods;
identify a functional purpose of the disjoint code cluster based on a business document corpus corresponding to the monolithic application; and
recommend a microservice to replace the disjoint code cluster based on the functional purpose.

18. The computer program product of claim 17, wherein the business document corpus includes at least one from a group consisting of a design document, a user guide, a code annotation, a wiki-document, a github-document, and a readme-document corresponding to the monolithic application.

19. The computer program product of claim 17, wherein the code property graph is a multi-graph that concurrently depicts structure of the source code, control flows in the source code, and data dependencies in the source code.

20. The computer program product of claim 17, wherein the program instructions are further executable to cause the processing component to:
generate the code property graph based on source code of the monolithic application, wherein the code property graph comprises a combination of an abstract syntax tree, a control flow graph, and a program dependence graph characterizing the monolithic application; and
augment edge weights of the code property graph based on the temporal code evolution, wherein the temporal code evolution comprises the changes to the source code of the monolithic application over time.

21. An apparatus, comprising:
a processor, operably coupled to a memory, that executes computer-executable components stored in the memory, wherein the computer-executable components comprise:
a community detection component that identifies candidates for microservice decomposition in a monolithic application based on a code property graph corresponding to the monolithic application, wherein the code property graph is generated based on an analysis of a temporal code evolution of the monolithic application that identifies groups of code changes of the monolithic application that occur in respective defined time periods;
a topic modeling component that identifies functions respectively performed by the identified candidates based on business documents corresponding to the monolithic application; and
a microservices component that replaces at least one of the identified candidates of the monolithic application with at least one microservice based on the functions.

22. The apparatus of claim 21, wherein the business documents include at least one from a group consisting of a design document, a user guide, a code annotation, a wiki-document, a github-document, and a readme-document corresponding to the monolithic application.

23. The apparatus of claim 21, wherein the code property graph is a multi-graph that concurrently depicts structure of the source code, control flows in the source code, and data dependencies in the source code.

24. A computer-implemented method, comprising:
identifying, by a device communicatively coupled to a processor, candidates for microservice decomposition in a monolithic application based on a code property graph corresponding to the monolithic application, wherein the code property graph is generated based on an analysis of a temporal code evolution of the monolithic application that identifies groups of code changes of the monolithic application that occur in respective defined time periods;
identifying, by the device, functions respectively performed by the identified candidates based on business documents corresponding to the monolithic application; and
replacing, by the device, at least one of the identified candidates of the monolithic application with at least one microservice based on the functions.

25. The computer-implemented method of claim 24, wherein the code property graph is a multi-graph that concurrently depicts structure of the source code, control flows in the source code, and data dependencies in the source code.

* * * * *